United States Patent
Nanami

(10) Patent No.: US 8,369,995 B2
(45) Date of Patent: Feb. 5, 2013

(54) CENTRAL AIR-CONDITIONING SYSTEM

(75) Inventor: Tomoyuki Nanami, Kariya (JP)

(73) Assignee: Denso Wave Incorporated, Tokyo (JP)

( * ) Notice: Subject to any disclaimer, the term of this patent is extended or adjusted under 35 U.S.C. 154(b) by 502 days.

(21) Appl. No.: 12/727,680

(22) Filed: Mar. 19, 2010

(65) Prior Publication Data

US 2011/0231019 A1    Sep. 22, 2011

(51) Int. Cl.
*G05D 23/00* (2006.01)
*F24F 3/00* (2006.01)

(52) U.S. Cl. ......... 700/277; 700/278; 165/237; 165/257

(58) Field of Classification Search .......... 700/276–278; 236/46 R, 46 C; 165/237, 257, 212, 208, 165/209
See application file for complete search history.

(56) References Cited

U.S. PATENT DOCUMENTS

| | | | |
|---|---|---|---|
| 5,395,042 A * | 3/1995 | Riley et al. | 236/46 R |
| 6,912,429 B1 * | 6/2005 | Bilger | 700/276 |
| 2008/0099570 A1 * | 5/2008 | Krebs et al. | 236/46 R |
| 2010/0243231 A1 * | 9/2010 | Rosen | 165/237 |

FOREIGN PATENT DOCUMENTS

JP    A-11-294839    10/1999

\* cited by examiner

*Primary Examiner* — Charles Kasenge
*Assistant Examiner* — Steven Garland
(74) *Attorney, Agent, or Firm* — Oliff & Berridge, PLC

(57) ABSTRACT

A central air-conditioning system conditions a house having a plurality of rooms. When a person is not present in any of the rooms, each room is conditioned in energy-saving conditioning mode having a low load. On the other hand, when the person is detected in any of the rooms, a controller switches an operating mode for conditioning the room, in which the person is detected, from the energy-saving conditioning to rapid conditioning. Air-conditioner ducts respectively connected to the remaining rooms are closed. Therefore, cold air or warm air from an air-conditioning unit is supplied to the room in which the person is detected, while the cold air or warm air is not supplied to the rooms in which the person is not present. As a result, the room that has been switched from energy-saving conditioning to rapid conditioning is conditioned in a concentrated manner.

3 Claims, 16 Drawing Sheets

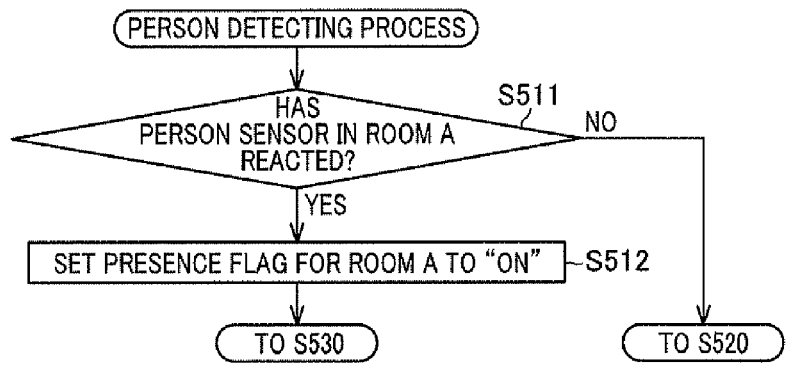
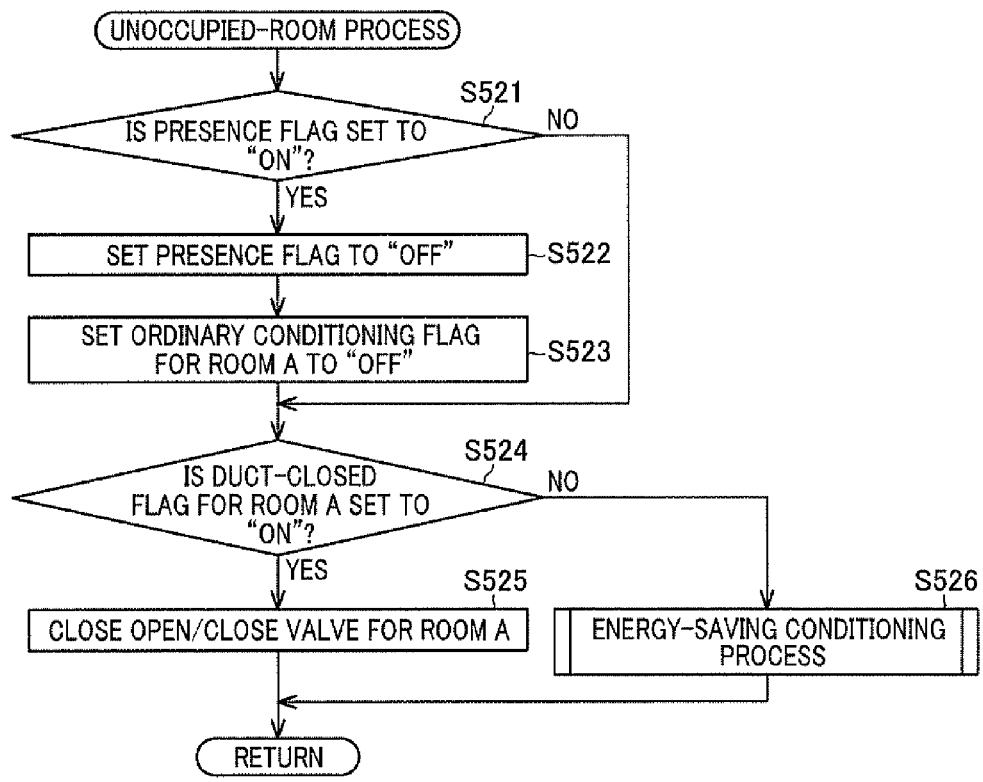

CENTRAL AIR-CONDITIONING SYSTEM

FIELD OF THE INVENTION

The present invention relates to a central air-conditioning system that conditions a plurality of rooms in a house with a single air-conditioning unit.

DESCRIPTION OF THE RELATED ART

For example, a central air-conditioning system is known that conditions a plurality of rooms in a house using a single air-conditioning unit, such as a heat pump. In the central air-conditioning system, the air-conditioning unit and each room are connected by air-conditioner ducts. Cold air or warm air generated by heat exchange performed in the air-conditioning unit is supplied to each room via the air-conditioner ducts. A controller of the central air-conditioning system individually controls the temperature of each room to a desired set temperature using the cold air or warm air sent from the air-conditioning unit.

Measures supporting the energy-conservation consciousness of recent years are essential also in a central air-conditioning system such as this. Therefore, an energy conservation measure is proposed for central air-conditioning systems in which a controller controls the temperature of a room in which a resident is present, among a plurality of rooms in the house, to a comfort temperature near a set temperature and controls the temperatures of the rooms in which the resident is not present to an energy-saving temperature that differs by several degrees Celsius from the set temperature, as shown in Japanese Patent Laid-open Publication No. 11-294839.

However, when temperature control is switched under a condition that the resident is present in the room or is not present in the room as in Patent Literature 1, it is difficult to quickly change the temperature of a room the resident has entered, when the resident enters an unoccupied room. In other words, the central air-conditioning system simultaneously conditions the plurality of rooms within the house. Therefore, in the central air-conditioning system, regardless of the resident's wish for the temperature of the room he has entered to change as quickly as possible from the energy-saving temperature to the comfort temperature, it is difficult to quickly change only the temperature of the room the resident has entered from the energy-saving temperature to the comfort temperature while maintaining conditioning of the plurality of rooms. As a result, compared, for example, to a room air-conditioner, the change in the temperature of the room the resident has entered is gradual, causing a problem in that the resident experiences discomfort.

The present invention has been achieved in light of the above-described problem. An object of the present invention is to provide a central air-conditioning system capable of handling rapid temperature change while maintaining overall conditioning of a house.

Another object of the present invention is to provide a central air-conditioning system that facilitates changes in control even when specifications and designs are changed, by eliminating effects on other rooms when controlling the temperature of one room, in addition to being capable of supporting rapid temperature change while maintaining overall conditioning of a house.

SUMMARY OF THE INVENTION

According to a first aspect of the invention, when a person is detected in any room among a plurality of rooms in a house, a controller switches an operating mode for conditioning a targeted room in which the person is detected from energy-saving conditioning to rapid conditioning. When performing rapid conditioning of the targeted room in which the person is detected, the controller closes an open/close valve provided in a conditioner duct connecting an air-conditioning unit with a non-targeted room other than the targeted room. As a result, conditioned cold air or warm air is supplied to the targeted room in which the person is detected. The conditioned cold air or warm air is not supplied to the non-targeted room in which the person is not detected. As a result, the cold air or warm air from the air-conditioning unit is supplied in a concentrated manner to the targeted room that is switched from energy-saving conditioning to rapid conditioning. On the other hand, because the person is not present in the non-targeted room, the person does not experience discomfort even when the supply of cold air or warm air is interrupted. When rapid conditioning of the targeted room is completed, the cold air or warm air generated by the air-conditioning unit is once again supplied to each room in the house including the non-targeted room. Therefore, the invention can handle rapid temperature change while maintaining overall conditioning of the house.

According to a second aspect of the invention, when the person is not detected in the non-targeted room, in addition to a duct-closed flag indicating that an open/close valve is closed being set to ON, the open/close duct is also closed. In other words, when the person is not detected in the non-targeted room, in addition to the duct-closed flag being set to ON, an air-conditioner duct connected to the non-targeted room is immediately closed. As a result, the open/close valve is opened and closed regardless of whether control is performed in another targeted room or non-targeted room. Therefore, process can be simplified.

According to a third aspect of the invention, when a when a person is detected in any room among a plurality of rooms in a house, a controller switches an operating mode for conditioning a targeted room in which the person is detected from energy-saving conditioning to rapid conditioning. When performing rapid conditioning of the targeted room in which the person is detected, the controller closes an open/close valve provided in a conditioner duct connected to a non-targeted room other than the targeted room from an air-conditioning unit. As a result, conditioned cold air or warm air is supplied to the targeted room in which the person is detected. The conditioned cold air or warm air is not supplied to the non-targeted room in which the person is not detected. As a result, the cold air or warm air from the air-conditioning unit is supplied in a concentrated manner to the targeted room that is switched from energy-saving conditioning to rapid conditioning. On the other hand, because the person is not present in the non-targeted room, the person does not experience discomfort even when the supply of cold air or warm air is interrupted. When rapid conditioning of the targeted room is completed, the cold air or warm air generated by the air-conditioning unit is once again supplied to each room in the house including the non-targeted room. Therefore, the invention can handle rapid temperature change while maintaining overall conditioning of the house. In addition, according to the third aspect of the invention, the controller controls only the opening and closing of the open/close valve of the targeted room. Therefore, processing by the controller is completed by only control of the targeted room. Control of another targeted room or non-targeted room is not affected. As a result, control routines and procedures are simplified. Therefore, when subsequent maintenance is performed, or when changes to specification or design are made in accompaniment with product improvement and the like, control can be more easily added and changed. In addition, control is more versatile, allowing reuse without changing specifications and the like accumulated by past developments.

BRIEF DESCRIPTION OF THE DRAWINGS

In the accompanying drawings:

FIG. 4A to FIG. 4C are diagrams of a relationship between time and temperature of the central air-conditioning system according to the first embodiment, in which FIG. 4A shows an ordinary set temperature and an unoccupied-room set temperature during cooling, FIG. 4B shows temperature change between rapid conditioning mode and ordinary conditioning mode during cooling in a targeted room, and FIG. 4C shows temperature change in rapid conditioning mode during cooling in a non-targeted room;

FIG. 7 is a diagram showing the flow of a person detecting process for the room A in the central air-conditioning system according to the first embodiment;

FIG. 8 is a diagram showing the flow of an unoccupied-room process for the room A in the central air-conditioning system according to the first embodiment;

DETAILED DESCRIPTION OF THE PREFERRED EMBODIMENTS

Several preferred embodiments of a central air-conditioning system of the present invention will hereinafter be described with reference to the drawings. Constituent sections of the embodiments that are essentially the same are given the same reference numbers. Explanations thereof are omitted.

First Embodiment

Figure 1:
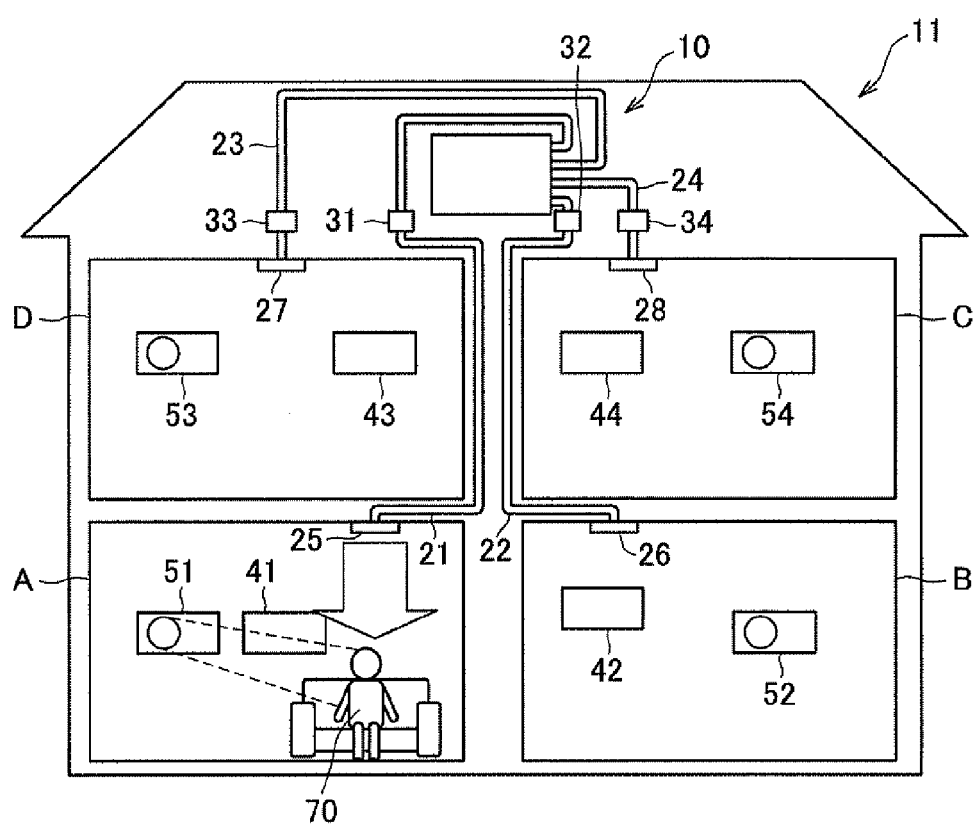
FIG. 1 is a schematic diagram of a house to which a central air-conditioning system according to a first embodiment of the present invention is applied, showing a state in which rapid conditioning of room A is being performed.
Figure 2:
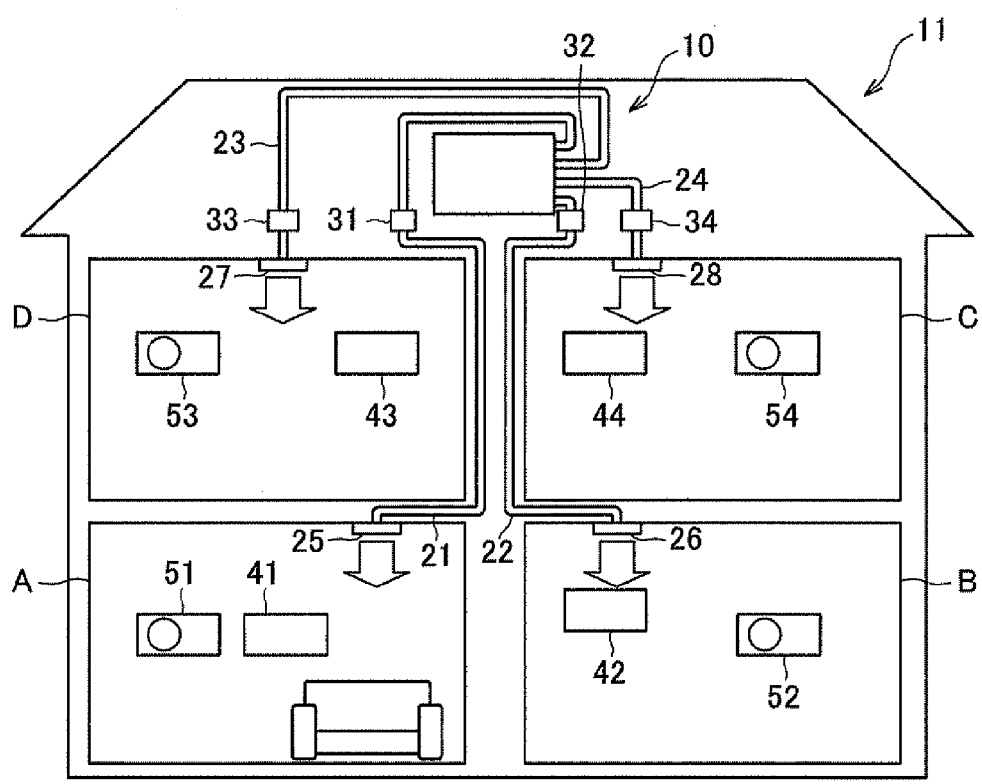
FIG. 2 is a schematic diagram of a house to which the central air-conditioning system according to the first embodiment is applied, showing a state in which ordinary conditioning of all rooms A to D is being performed.
Figure 3:
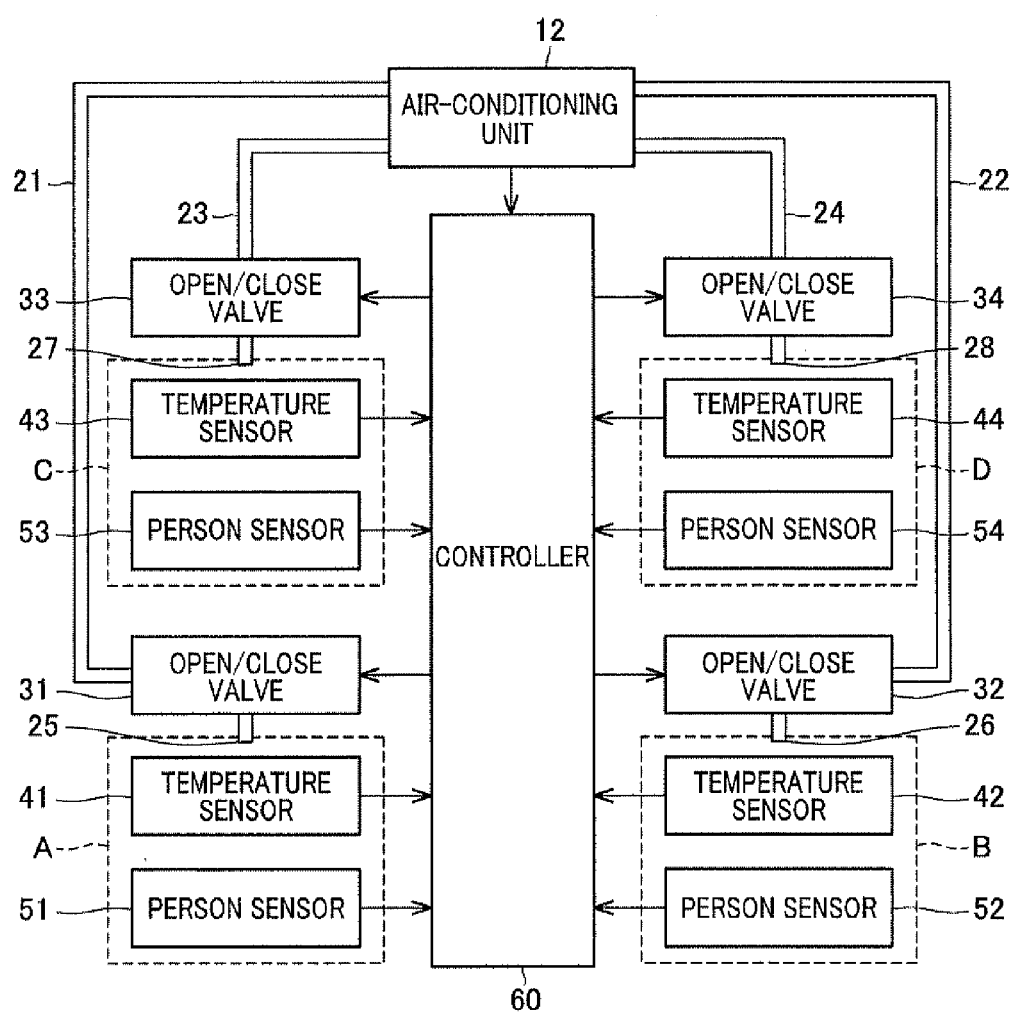
FIG. 3 is a block diagram of the central air-conditioning system according to the first embodiment.

First, a configuration of a central air-conditioning system according to a first embodiment of the present invention will be described. As shown in FIG. 1 and FIG. 2, a central air-conditioning system 10 is provided in a house 11 having a plurality of rooms: room A, room B, room C, and room D. Here, to simplify the explanation, the central air-conditioning system 10 is described giving as an example the house 11 having four rooms A to D. As shown in FIG. 1 to FIG. 3, the central air-conditioning system 10 includes an air-conditioning unit 12, air-conditioner ducts 21 to 24, open/close valves 31 to 34, temperature sensors 41 to 44, person sensors 51 to 54, and a controller 60 which is called a thermostat in some cases. The temperature sensors 41 to 44 and the person sensors 51 to 54 are respectively provided in the four rooms A to D.

The air-conditioning unit 12 is, for example, configured by an external unit and an internal unit, and includes a known heat exchanger, such as a heat pump. With this configuration, the air-conditioning unit 12 supplies cold air or warm air to each room A to D. The air-conditioner duct 21 connects the air-conditioning unit 12 and the room A. In a similar manner, the air-conditioner duct 22 connects the air-conditioning unit 12 and the room B. The air-conditioner duct 23 connects the air-conditioning unit 12 and the room C. The air-conditioner duct 24 connects the air-conditioning unit 12 and the room D. An end section of each air-conditioner duct 21 to 24 on the room A to D side forms an air outlet 25 to 28 from which the cold air or warm air supplied by the air-conditioning unit 12 is blown. The open/close valves 31 to 34 are respectively provided in the air-conditioner ducts 21 to 24. In other words, the open/close valve 31 opens and closes the air-conditioner duct 21. the open/close valve 32 opens and closes the air-conditioner duct 22. The open/close valve 33 opens and closes the air-conditioner duct 23. The open/close valve 34 opens and closes the air-conditioner duct 24.

The controller 60 is configured by a microcomputer composed of, for example, a central processing unit (CPU), a read-only memory (ROM), and a random access memory (RAM). The controller 60 performs overall control of the central air-conditioning system 10 in adherence to a computer program stored in the ROM. The controller 60 is connected to the above-described air-conditioning unit 12 and each open/close valve 31 to 34. The air-conditioning unit 12 switches between generating cold air and generating warm air, and changes the amount of air generated in adherence to instructions from the controller 60. Each open/close valve 31 to 34 opens or closes the corresponding air-conditioner duct 21 to 24 in adherence to instructions from the controller 60.

The controller 60 is connected to the temperature sensors 41 to 44 respectively provided in the rooms A to D. The temperature sensor 41 detects the temperature of the room A and outputs the detected temperature to the controller 60 as an electrical signal. In a similar manner, the temperature sensor 42 outputs the detected temperature of the room B to the controller 60 as an electrical signal. The temperature sensor 43 outputs the detected temperature of the room C to the controller 60 as an electrical signal. The temperature sensor 44 outputs the detected temperature of the room D to the controller 60 as an electrical signal. The controller 60 is also connected to the person sensors 51 and 54 respectively provided in the rooms A to D. As shown in FIG. 1, the person sensor 51 detects whether a person 70 is present in the room A using, for example, infrared rays or images, and outputs the detected presence or absence of the person 70 to the controller 60 as an electrical signal. In a similar manner, the person sensor 52 outputs the detected presence or absence of the person 70 in the room B to the controller 60 as an electrical signal. The person sensor 53 outputs the detected presence or absence of the person 70 in the room C to the controller 60 as an electrical signal. The person sensor 54 outputs the detected presence or absence of the person 70 in the room D to the controller 60 as an electrical signal.

The controller 60 individually adjusts the degree of opening of each open/close valve 31 to 34 that opens and closes the air-conditioner duct 21 to 24, based on the presence or absence of the person 70 in each room A to D detected by the person sensor 51 to 54 and the temperature of each room A to D detected by the temperature sensor 41 to 44. As a result, the controller 60 controls the temperature based on the presence or absence of the person 70 and the temperature of each room A to D.

Next, operations of the central air-conditioning system 10, configured as above, will be described.

(Air-Conditioning Mode)

Figure 4A:
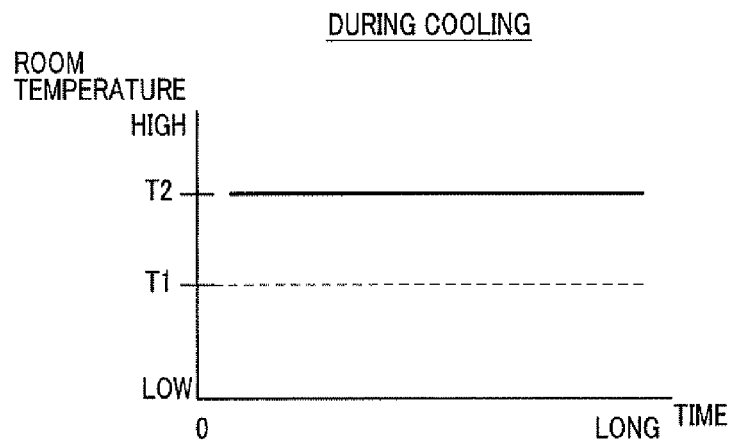

The controller 60 operates in ordinary conditioning mode for performing ordinary conditioning, energy-saving conditioning mode for performing energy-saving conditioning, or rapid conditioning mode for performing rapid conditioning, depending on the presence or absence of the person 70 in the rooms A to D of the house 11. As shown in FIG. 4A, in ordinary conditioning mode, each room A to D is controlled to an ordinary set temperature T1 set in advance. In energy-saving mode, each room A to D is controlled to an unoccupied-room set temperature T2 set in advance and having a lower load than the ordinary set temperature T1 for ordinary conditioning. For example, when the ordinary set temperature T1 is set to 25° C. during cooling, the unoccupied-room set temperature T2 is set to 28° C. or the like that has a lower load. On the other hand, when the ordinary set temperature T1 during heating is set to 25° C., the unoccupied-room set temperature T2 is set to 22° C. or the like that has a lower load.

Figure 4B:
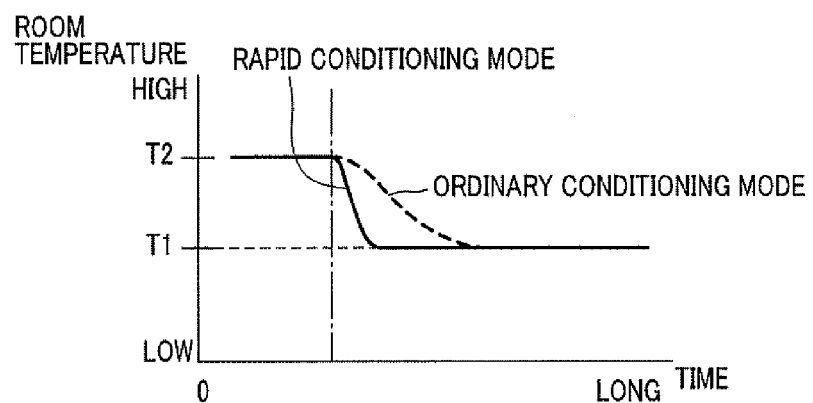
Figure 4C:
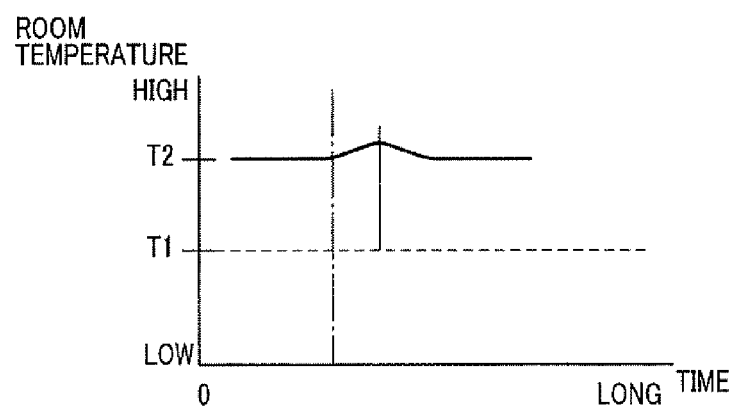

In rapid conditioning mode, for example, as shown in FIG. 1, the room A in which the person 70 is detected is conditioned in a concentrated manner to quickly change the temperature to the ordinary set temperature T1 set in advance. As a result, as indicated by a solid line in FIG. 4B, the temperature of the room A in which rapid conditioning is performed changes to the ordinary set temperature T1 more quickly than when ordinary conditioning, indicated by a broken line, is performed. On the other hand, when rapid conditioning is performed in the room A, the cold air or warm air generated by the air-conditioning unit 12 is supplied in a concentrated manner to the room A. Therefore, while the temperature of the room A quickly changes to the ordinary set temperature T1 as indicated by the solid line in FIG. 4B, the temperatures of the rooms other than the room A, namely the rooms B to D, change (rise during cooling) as shown in FIG. 4C because the supply of cold air or warm air to the rooms B to D stops during rapid conditioning of the room A. However, when rapid conditioning of the room A is performed, the person 70 is not in the rooms B to D and therefore does not experience discomfort even when the temperatures change in the rooms B to D. On the other hand, in ordinary conditioning mode and energy-saving mode, each room A to D is evenly conditioned.

(Overall Process)

First, the flow of an overall process performed by the central air-conditioning system 10 will be described with reference to FIG. 5.

When the central air-conditioning system 10 is turned ON, the controller 60 performs an air-conditioning unit startup process for starting the air-conditioning unit 12 (S100). When the air-conditioning unit 12 is started, the controller 60 performs a startup person detection process for detecting the presence of the person 70 in each room A to D at startup (S200). In the startup person detection process, whether the person 70 is present in any of the rooms A to D is detected when the air-conditioning unit 12 is started. The controller 60 detects whether a person is present for each room A to D based on the electrical signal outputted from each person sensor 51 to 54 provided in each room A to D.

The controller 60 sets a presence flag indicating the presence of the person 70 to "ON" for an occupied-at-startup room in which the person 70 is detected at S200. In addition, the controller 60 performs an ordinary conditioning process in the occupied-at-startup room (S300). In the ordinary conditioning process, ordinary conditioning is performed in which the temperature is controlled to the ordinary set temperature T1. On the other hand, the controller 60 performs an energy-saving conditioning process in unoccupied-at-startup rooms in which the person 70 is not detected at S200 (S400). In the energy-saving conditioning process, energy-saving conditioning is performed in which the temperature is controlled to the unoccupied-room set temperature T2. Then, after performing the ordinary conditioning process at S300 and the energy-saving conditioning process at S400, the controller 60 proceeds to individual room conditioning control processes for controlling the temperatures separately for each room A to D (S500 to S800). The controller 60 repeats the individual room conditioning control processes at S500 to S800 until the central air-conditioning system 10 is turned OFF.

(Individual Room Conditioning Control Processes)

Figure 6:
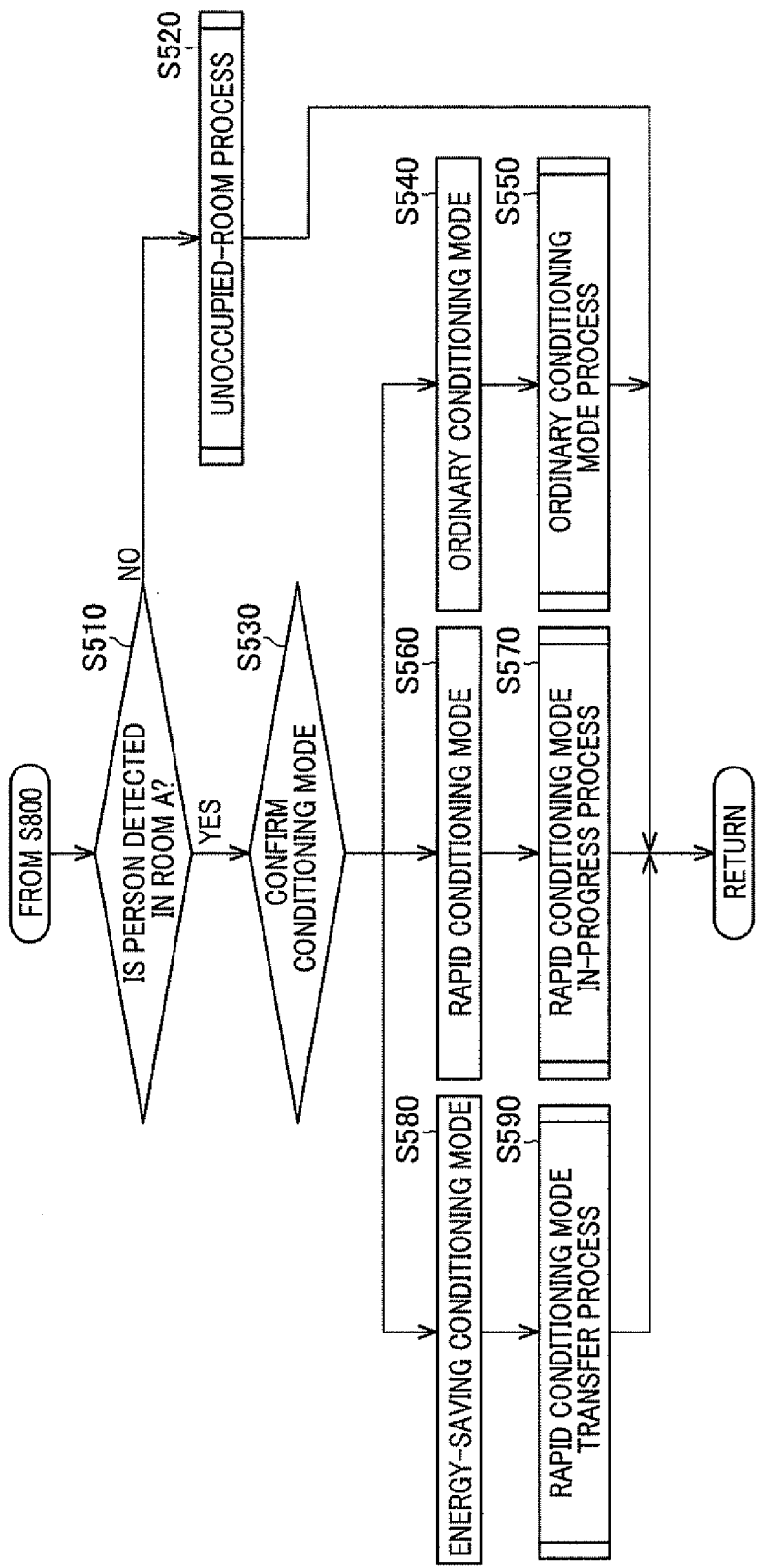
FIG. 6 is a diagram showing the flow of a conditioning control process for the room A in the central air-conditioning system according to the first embodiment.

Next, the flow of the individual room conditioning control processes will be described with reference to FIG. 6.

Here, the flow of the room A conditioning control process at S500 will be described with reference to FIG. 6. The room B conditioning control process at S600, the room C conditioning control process at S700, and the room D conditioning control process at S800 are essentially the same as the room A conditioning control process. Explanations thereof are omitted.

When the room D conditioning control process at Step S800 is completed, the controller 60 returns to S500 and proceeds to the room A conditioning control process. In the room A conditioning control process, the controller 600 performs a person detecting process (or human detecting process) for detecting whether the person 70 is present in the room A serving as a targeted room (S510). The controller 60 detects whether the person 70 is present based on an electrical signal from the person sensor 51 in the room A, in a manner similar to that at S200.

When the person 70 is not detected in the room A at S510 (No at S510), the controller 60 proceeds to an unoccupied-room process (S520). On the other hand, when the person 70 is detected in the room A at S510 (Yes at S510), the controller 60 performs a conditioning mode confirmation process for confirming the conditioning mode of the room A (S530). Here, when the person 70 is detected in the room A at S510 and the conditioning mode confirmed at S530 is ordinary conditioning mode (S540), the controller 60 proceeds to an ordinary conditioning mode process for continuing operation in ordinary conditioning mode (S550). In other words, when the person 70 is detected in the room A at S510 and the conditioning mode confirmed at S530 is ordinary conditioning mode, the person 70 remains present in the room A, and the temperature of the room A is controlled to the ordinary set temperature T1 in ordinary conditioning mode. Therefore, the controller 60 performs the ordinary conditioning mode process for continuing operation in ordinary conditioning mode.

On the other hand, when the person 70 is detected in the room A at S510 and the conditioning mode confirmed at S530 is rapid conditioning mode (S560), the controller 60 proceeds to a rapid conditioning mode in-progress process for continuing operation in rapid conditioning mode (S570). In other words, when the person 70 is detected in the room A at S510 and the conditioning mode confirmed at S530 is rapid conditioning mode, the room A remains in rapid conditioning mode for quickly controlling the temperature to the ordinary set temperature T1. Therefore, controller 60 performs the rapid conditioning mode in-progress process for maintaining operation in rapid conditioning mode.

When the person 70 is detected in the room A at S510 and the conditioning mode confirmed at S530 is energy-saving mode (S580), the controller 60 proceeds to a rapid conditioning mode transfer process for switching operation from energy-saving mode to rapid conditioning mode (S590). In other words, when the person 70 is detected in the room A at S510 and the conditioning mode confirmed at S530 is energy-saving conditioning mode, the room A is at a state of transition from a state in which the temperature is controlled to the unoccupied-room set temperature T2 having a lower load than the ordinary set temperature T1 to a state in which the temperature is controlled to the ordinary set temperature T1. Therefore, the controller 60 performs the rapid conditioning mode transfer process for switching operation from energy-saving conditioning mode to rapid conditioning mode.

When the controller 60 completes the process for the room A by performing any of the unoccupied-room process at S520, the ordinary conditioning mode process at S550, the rapid conditioning mode in-progress process at S570, or the rapid conditioning mode transfer process at S590, the controller 60 proceeds to the process for the room B at S600.

In the person detecting process at S510, as shown in FIG. 7, the controller 60 judges whether the person sensor 51 in the room A has reacted (S511). When the person sensor 51 reacts at S511, the controller 60 judges that the person 70 is in the room A. The controller 60 sets the presence flag for the room A to "ON" (S512) and proceeds to S530. When the person sensor 51 does not react at S511, the controller 60 judges that the person 70 is not in the room A and proceeds to S520.

(Unoccupied-Room Process)

The flow of the above-mentioned unoccupied-room process at S520 will be described with reference to FIG. 8.

When the controller 60 judges that the person 70 is not in the room A in the person detecting process at S510, the controller 60 performs a presence flag checking process for determining whether the presence flag (the first flag) for the room A is set to "ON" (S521). The presence flag indicates the presence of the person 70 in the room A. The presence flag is set to "ON" at S300 when the person 70 is confirmed to be in the room A at startup of the central air-conditioning system 10. The presence flag is also set to "ON" when the person 70 is confirmed to be in the room A in the person detecting process at S510. Here, in the unoccupied-room processing, because the person 70 is determined to not be in the room A in the person detecting process at S510, the controller 60 sets the presence flag to "OFF" (S522). In other words, when the person 70 is in the room A at startup of the central air-conditioning system 10 but subsequently leaves the room A, the controller 60 sets the presence flag for the room A to "OFF" at S522.

When the controller 60 sets the presence flag for the room A to "OFF" at S522, the controller 60 also sets an ordinary conditioning flag (a second flag) for the room A to "OFF" (S523). The ordinary conditioning flag is set to "ON" when ordinary conditioning is required to be performed in a room to be temperature-controlled. However, when the person 70 is not in the room A that is to be controlled herein, ordinary conditioning is not required to be continued in the room A. Therefore, the controller 60 sets the presence flag for the room A to "OFF" at S522 and also sets the ordinary conditioning flag for the room A to "OFF".

When the controller 60 judges that the presence flag for the room A is set to "OFF" at S521 (No at S521) or sets the ordinary conditioning flag to "OFF" at S523, the controller 60 determines whether a duct-closed flag (a third flag) for the room A is set to "ON" (S524). The duct-closed flag is set to "ON" when the air-conditioner duct 21 of the room A is closed by the open/close valve 31 provided in the air-conditioner duct 21. Therefore, the controller 60 may have possibly judged that the open/close valve 31 should close the air-conditioner duct 21 of the room A because of rapid conditioning performed in the individual room conditioning process for any of the rooms B to D other than the room A. Therefore, the controller 60 judges whether the duct-closed flag for the room A is set to "ON".

When the duct-closed flag for the room A is set to "ON" at S524 (Yes at S524), the controller 60 closes the air-conditioner duct 21 connected to the room A using the open/close valve 31 based on the judgment that the air-conditioner duct 21 connected to the room A should be closed in accompaniment with the rapid conditioning being performed in any of the rooms B to D other than the room A (S525). On the other hand, when the controller 60 judges that the duct-closed flag for the room A is not set to "ON" at S524 or, in other words, the duct-closed flag is set to "OFF" (No at S524), the controller 60 proceeds to the energy-saving conditioning process for controlling the room A in energy-saving conditioning mode (S526). When the duct-closed flag for the room A is set to "ON" as described above, the rapid conditioning process is being performed in any of the rooms B to D other than the room A. Therefore, when the duct-closed flag for the room A is "ON", the controller 60 closes the air-conditioner duct 21 connected to the room A using the open/close valve 31 and blocks the cold air or warm air supplied by the air-conditioning unit 12 from flowing into the room A. As a result, the cold air or warm air supplied by the air-conditioning unit 12 is restricted from flowing into the room A in which the person 70 is not present and is supplied in a concentrated manner to any of the rooms B to D in which the rapid conditioning process is being performed. When the duct-closed flag for the room A is not set to "ON", the rapid conditioning process is not performed in any of the rooms B to D other than the room A. Therefore, the controller 60 controls the room A in which the person 70 is not present in energy-saving conditioning mode when the duct-closed flag for the room A is turned "OFF".

After closing the air-conditioner duct 21 connected to the room A using the open/close valve 31 at S525 or proceeding to the energy-saving conditioning process for the room A at S526, the controller 60 completes the process for the room A and proceeds to conditioning control of the room B at S600.

(Conditioning Mode Confirmation Process)

Next, details of the flow of the conditioning mode confirmation process at S530 in FIG. 6 will be described with reference to FIG. 9.

When the controller 60 judges that the person 70 is in the room A in the person detecting process at S510, the controller 60 judges whether the ordinary conditioning flag for the room A is set to "ON" (S531). When the controller 60 judges that the ordinary conditioning flag for the room A is set to "ON" (Yes at S531), the controller 60 proceeds to S540 and continues conditioning the room A in ordinary conditioning mode to continue ordinary conditioning of the room A. On the other hand, when the controller 60 judges that the ordinary conditioning flag for the room A is not set to "ON" at S531 (No at S531), the controller 60 judges whether the temperature of the room A is within a temperature control range Δt (S532). The controller 60 acquires the temperature of the room A from the temperature sensor 41 of the room A. Then, the controller 60 judges whether the acquired temperature is within the temperature control range Δt. The temperature control range Δt is a range of temperatures allowed as the ordinary set temperature T1 set for the room A. The temperature control range Δt is set to a range several degrees Celsius below and several degrees Celsius above the ordinary set temperature T1. For example, when the ordinary set temperature T1 of the room A is 25° C., the temperature control range Δt is set to 25° C.±3° C.

When the controller 60 judges that the temperature of the room A is within the temperature control range Δt (Yes at S532), the controller 60 sets the ordinary conditioning flag for performing ordinary conditioning in the room A to "ON" (S533) and sets a rapid conditioning flag (a fourth flag) for performing rapid conditioning in the room A to "OFF" (S534). The controller 60 then performs a duct restoring process (S535). In the duct restoring process, the controller 60 opens each open/close valve 32, 33, and 34 of each air-conditioner duct 22, 23, and 24 respectively connected to the rooms B to D other than the room A. When the temperature of the room A is within the temperature control range Δt, the temperature of the room A is near the ordinary set temperature T1. Therefore, the temperature of the room A is maintained at the ordinary set temperature T1 even when ordinary conditioning of the room A is continued. Therefore, when the temperature of the room A is within the temperature control range Δt, the controller 60 sets the ordinary conditioning flag for performing ordinary conditioning to "ON" and sets the rapid conditioning flag to "OFF" to continue ordinary conditioning of the room A. Furthermore, because rapid conditioning of the room A is not required to be performed, the controller 60 opens each open/close valve 32, 33, and 34 of each air-conditioner duct 22, 23, and 24 connected to the room B, the room C, and the room D and performs conditioning of the room B, the room C, and the room D. This is because, when rapid conditioning is performed in the room A in the preceding process, each open/close valve 32, 33, and 34 of each air-conditioner duct 22, 23, and 24 connected to the room B, the room C, and the room D is closed. In other words, as a result of the duct restoring process being performed at S535, each open/close valve 32, 33, and 34 of the room B, the room C, and the room D that had been closed in the preceding process is restored to the open state. The controller 60 sets the ordinary conditioning flag for the room A to "ON" at S533, sets the rapid conditioning flag for room A to "OFF" at S534, and performs the duct restoring process at S535. The controller 60 then proceeds to S540 and continues conditioning the room A in ordinary conditioning mode.

When the controller 60 judges that the temperature of the room A is not within the temperature control range Δt S532 (No at S523), the controller 60 judges whether the rapid conditioning flag for the room A is set to "ON" (S536). When the temperature of the room A is not within the temperature control range Δt, rapid conditioning is required to be performed to change the temperature of the room A to the ordinary set temperature T1. In this instance, when a judgment is made in the preceding process that rapid conditioning of the room A is required to be performed and the rapid conditioning flag for the room A is set to "ON", the conditioning mode for the room A has already changed to the rapid conditioning mode. The rapid conditioning flag is not required to be set to "ON" again. The controller 60 judges whether the rapid conditioning flag for the room A is set to "ON" at S536. When the rapid conditioning flag is set to "ON" (Yes at S536), the controller 60 judges that the operation is in rapid conditioning mode and proceeds to S560. The controller 60 proceeds to the rapid conditioning mode in-progress process at S570 to continue rapid conditioning. When the rapid conditioning flag is not set to "ON" (No at S536), the controller 60 judges that the operation is in energy-saving conditioning mode and proceeds to S580. The controller 60 proceeds to the rapid conditioning mode transfer process at S590 to perform rapid conditioning of the room A.

(Rapid Conditioning Mode Transfer Process)

Figure 10:
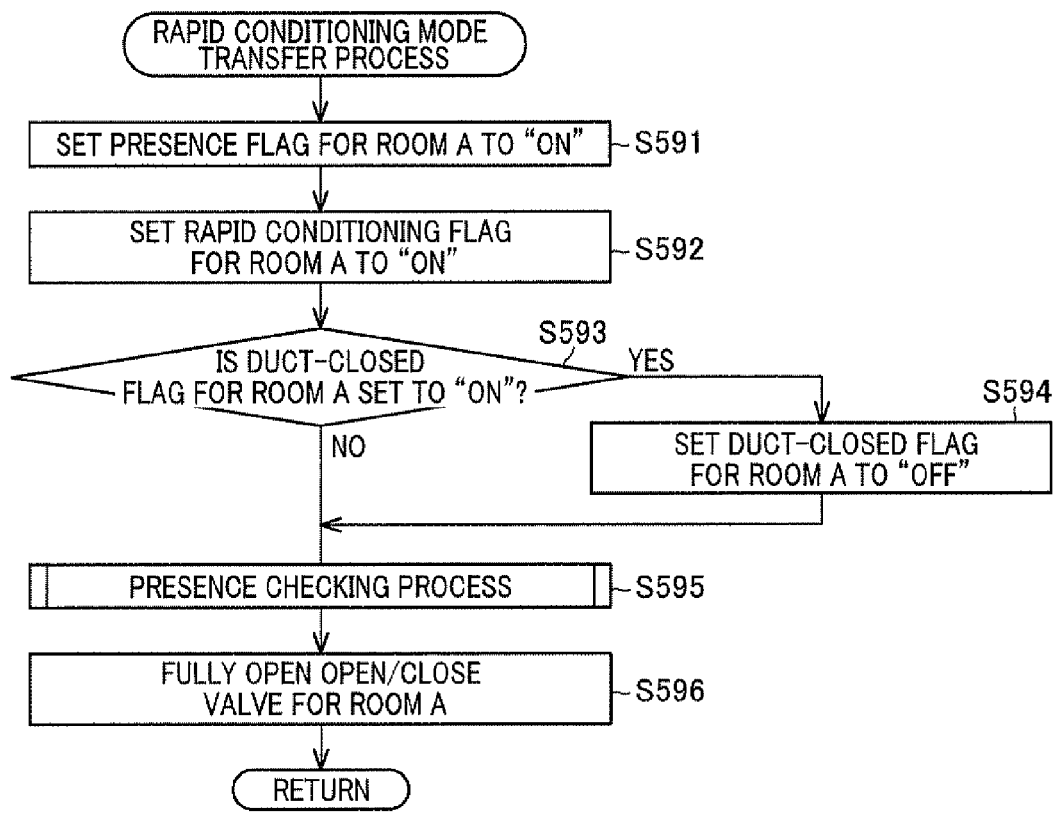
FIG. 10 is a diagram showing the flow of a rapid conditioning mode transfer process for the room A in the central air-conditioning system according to the first embodiment.

The flow of the rapid conditioning mode transfer process will be described with reference to FIG. 10.

Figure 9:
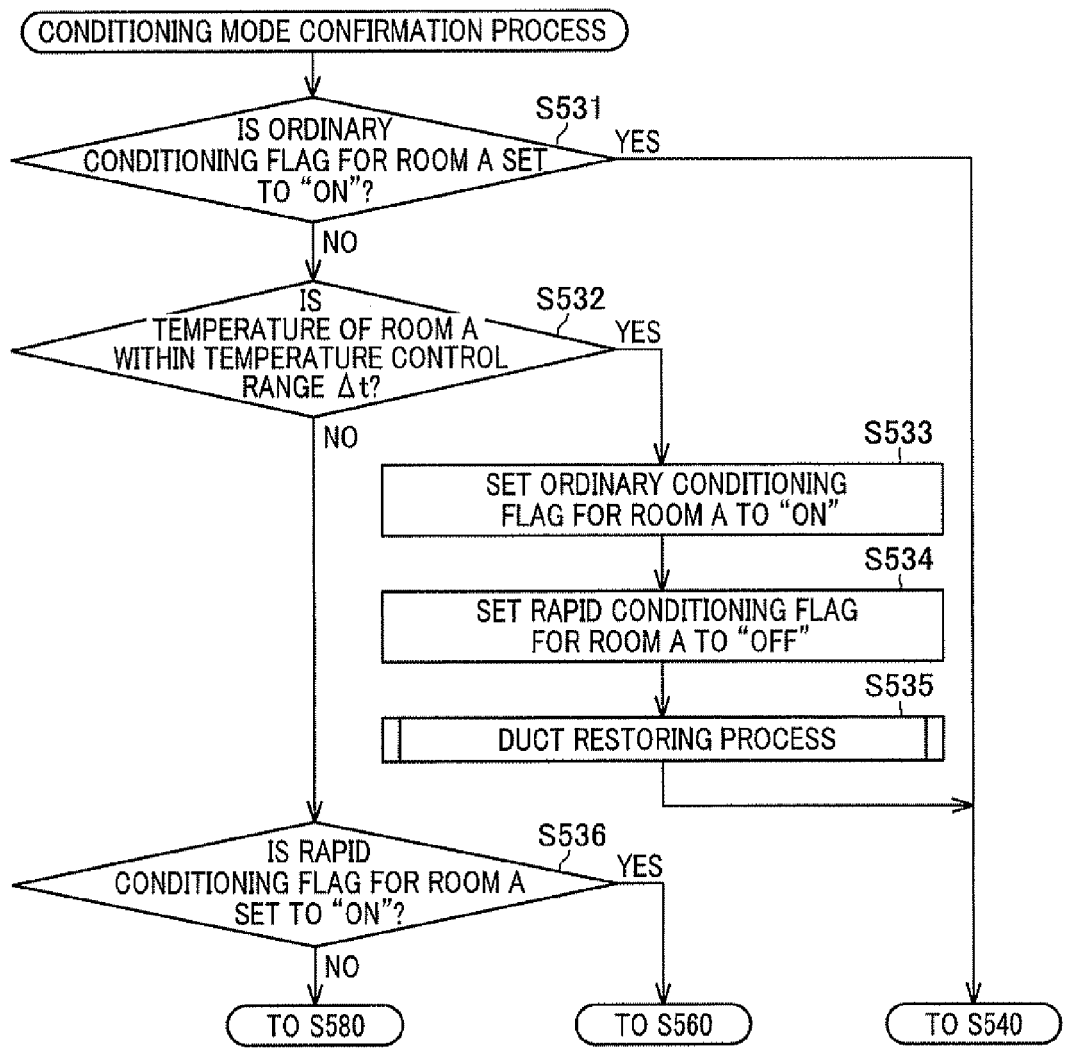
FIG. 9 is a diagram showing the flow of a conditioning mode confirmation process for room A in the central air-conditioning system according to the first embodiment.

When the rapid conditioning flag for the room A is not set to "ON" at S536 in FIG. 9, the controller 60 proceeds to the rapid conditioning mode transfer process as described above. For example, when conditioning in energy-saving conditioning mode is continued in the room A because the presence of the person 70 is not confirmed, the rapid conditioning mode transfer process is performed when the person 70 enters the room A. In other words, when conditioning in energy-saving conditioning mode is continued because the person 70 is not in the room A, the temperature of the room A is controlled to the unoccupied-room set temperature T2 having a lower load than the ordinary set temperature T1. Therefore, when the person 70 enters the room A, the temperature of the room A is most likely outside the range of the temperature control range Δt set based on the ordinary set temperature T1. Therefore, the controller 60 performs the rapid conditioning mode transfer process to switch operation in the room A from energy-saving conditioning mode to rapid conditioning mode.

When the person 70 is confirmed to have entered the room A at S510, the controller 60 sets the presence flag for the room A indicating the presence of the person 70 to "ON" (S591). Then, to change the operation in the room A to rapid conditioning mode, the controller 60 sets the rapid conditioning flag for the room A to "ON" (S592). Furthermore, the controller 60 judges whether the duct-closed flag for the room A is set to "ON" (S593). In other words, the controller 60 judges whether the duct-closed flag for closing the air-conditioner duct 21 is "ON", for the open/close valve 31 that opens and closes the air-conditioner duct 21 connected to the room A. This is because, when rapid conditioning of any of the rooms B to D other than the room A is performed, the duct-closed flag for closing the air-conditioner duct 21 connected to the room A using the open/close valve 31 is set to "ON".

When the controller 60 judges that the duct-closed flag for the room A is set to "ON" at S593 (Yes at S593), the controller 60 sets the duct-closed flag for the room A to "OFF" (S594). When the duct-closed flag for the room A is not set to "ON" at S593 (No at S593) or the controller 60 sets the duct-closed flag for the room A to "OFF" at S594, the controller 60 performs a presence checking process for checking the presence of the person 70 in the room B, the room C, and the room D that are non-targeted rooms other than the room A that is being controlled (S595). The controller 60 then fully opens the open-closed valve 31 provided in the air-conditioner duct 21 connected to the room A to perform rapid conditioning of the room A (S596).

(Rapid Conditioning Mode In-Progress Process)

Figure 11:
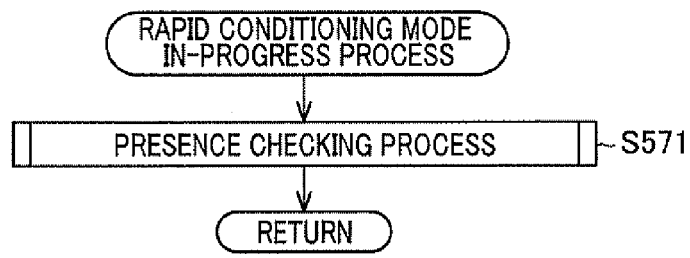
FIG. 11 is a diagram showing the flow of a rapid conditioning mode in-progress process for the room A in the central air-conditioning system according to the first embodiment.

The rapid conditioning mode in-progress process will be described with reference to FIG. 11.

When the rapid conditioning flag for the room A is set to "ON" at S536 in FIG. 9, the controller 60 proceeds to the rapid conditioning mode in-progress process as described above. The rapid conditioning mode in-progress process is performed when the room A is being conditioned in rapid conditioning mode in the preceding process and is continuously conditioned in rapid conditioning mode in the current process.

When the controller 60 judges that the rapid conditioning mode in-progress process is being performed for the room A in the conditioning mode confirmation process shown in FIG. 9, the controller 60 performs the presence checking process (S571). To continue conditioning the room A in rapid conditioning mode, a condition is required to be met in that the person 70 is not present in any of the other rooms B to D. In other words, when the room A is being conditioned in rapid conditioning mode, conditioning of the room B, the room C, and the room D is temporarily stopped, and the cold air or warm air generated by the air-conditioning unit 12 is supplied in a concentrated manner to the room A. Therefore, the controller 60 performs the presence checking process in the room B, the room C, and the room D during the rapid conditioning mode in-progress process.

(Ordinary Conditioning Mode Process)

The flow of the ordinary conditioning mode process will be described with reference to FIG. 12.

When the controller 60 judges that the ordinary conditioning flag for the room A is set to "ON" at S531 in the conditioning mode confirmation process at S530 (Yes at S531) and judges that the temperature of the room A is within the temperature control range Δt at S532 (Yes at S532), the controller 60 proceeds to the ordinary conditioning mode process as described above.

When the controller 60 judges that the ordinary conditioning mode process is being performed for the room A in the conditioning mode confirmation process shown in FIG. 9, the controller 60 acquires the temperature of the room A (S551). The controller 60 acquires the temperature of the room A from the temperature sensor 41 provided in the room A. The controller 60 controls the temperature of the room A based on the temperature of the room A acquired at S551 and the ordinary set temperature T1 set for the room A (S552). The controller 60 maintains the temperature of the room A at the ordinary set temperature T1 by controlling the degree of opening of the open/close valve 31, controlling the amount of operation of the air-conditioning unit 12, and the like.

(Energy-Saving Conditioning Process)

Figure 13:
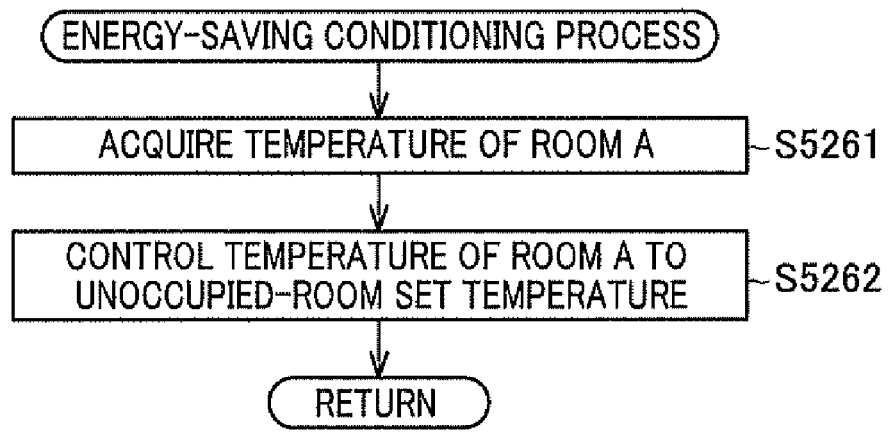
FIG. 13 is a diagram showing the flow of an energy-saving conditioning process for the room A in the central air-conditioning system according to the first embodiment.

The flow of the energy-saving conditioning process will be described with reference to FIG. 13.

When the controller 60 judges that the duct-closed flag for the room A is not set to "ON" at S524 in the unoccupied-room process at S520 (No at S524), the controller 60 performs the energy-saving conditioning process (S526). In the energy-saving conditioning process, the controller 60 acquires the temperature of the room A (S5261). The controller 60 acquires the temperature of the room A from the temperature sensor 41 provided in the room A. The controller 60 controls the temperature of the room A based on the temperature of the room A acquired at S5261 and the unoccupied-room set temperature T2 set for the room A (S5262).

(Duct Restoring Process)

Figure 14:
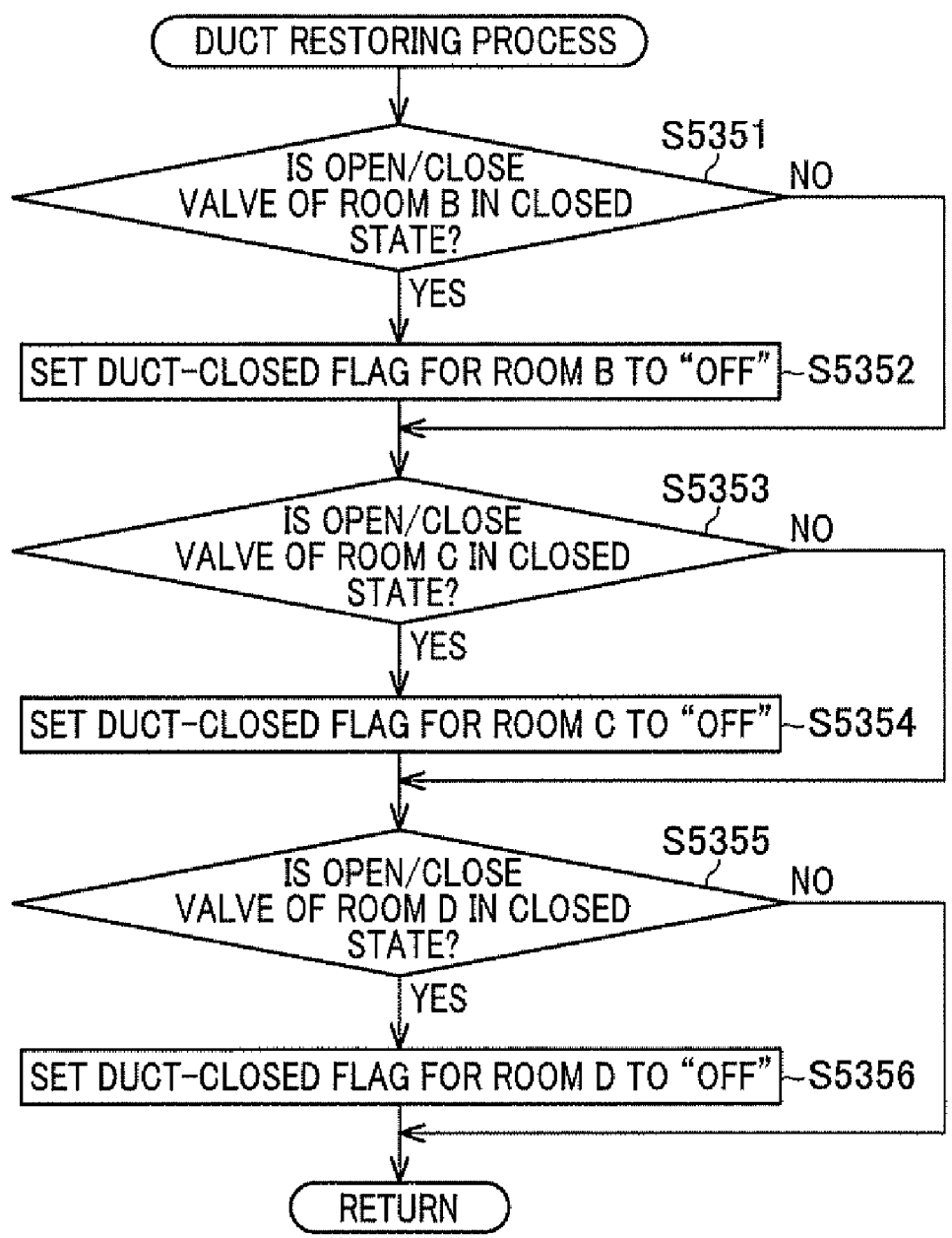
FIG. 14 is a diagram showing the flow of a duct restoring process in the central air-conditioning system according to the first embodiment.

Details of the above-mentioned duct restoring process at S535 will be described with reference to FIG. 14.

In the duct restoring process at S535, for each non-targeted room B, room C, and room D other than the room A that is being controlled among the plurality of rooms in the present description, the controller 60 judges whether each open/close valve 32, 33, and 34 in each air-conditioner duct 22, 23, and 24 connected to the non-targeted room B, room C, and room D is in a closed state. Specifically, the controller 60 judges whether the open/close valve 32 in the air-conditioner duct 22 connected to the room B that is a non-targeted room is in a closed state (S5351). For example, when rapid conditioning is performed in the room A, the open/close valve 32 in the air-conditioner duct 22 connected to the room B is in the closed state. In the other hand, when the rapid conditioning flag is set to "OFF" at S534, the operation in the room A changes from rapid conditioning mode to ordinary conditioning mode. Therefore, the open/close valve in each air-conditioner duct connected to the other rooms, such as the room B, is required to be opened. In this way, when the operation in the room A that is the targeted room is no longer in rapid conditioning mode, the controller 60 judges whether each open/close valve 32, 33, and 34 in each air-conditioner duct 22, 23, and 24 connected to the non-targeted room B, room C, and room D is in a closed state. When the open/close valve 32 of the air-conditioner duct 22 connected to the room B is in the closed state, the controller 60 sets the duct-closed flag for the room B to "OFF" (S5352). As a result, in the subsequent process for the room B at S600, the open/close valve 32 in the air-conditioner duct 22 connected to the room B is open. In a similar manner, the controller 60 judges whether the open/close valve 33 of the room C is in the closed state (S5353). When the open/close valve 33 of the room C is in the closed state, the controller sets the duct-closed flag for the room C to "OFF" (S5354). Furthermore, the controller 60 judges whether the open/close valve 34 of the room D is in the closed state (S5355). When the open/close valve 34 of the room D is in the closed state, the controller 60 sets the duct-closed flag for the room D to "OFF" (S5356).

(Presence Checking Process)

Figure 15:
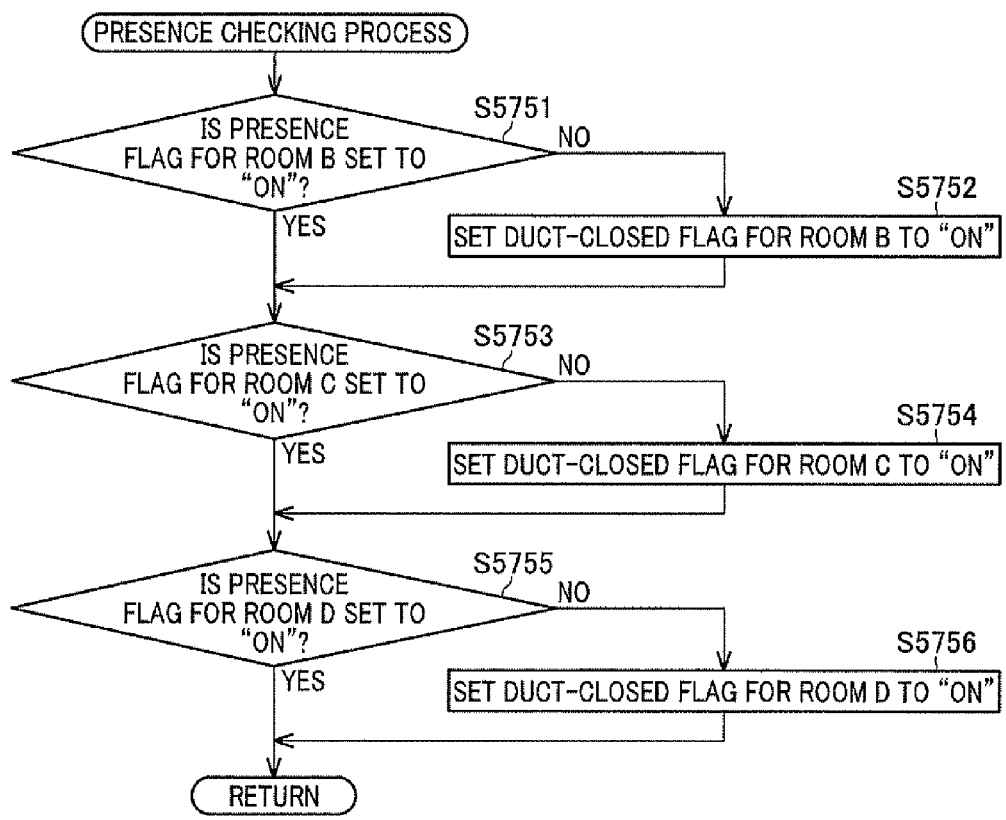
FIG. 15 is a diagram showing the flow of a presence checking process of the central air-conditioning system according to the first embodiment.

Details of the above-mentioned presence checking process at S571 and S595 will be described with reference to FIG. 15.

In the presence checking process at S571 and S595, the controller 60 checks whether the presence flag for each non-targeted room B, room C, and room D other than the room A that is being controlled among the plurality of rooms in the present description is set to "ON". Specifically, the controller 60 judges whether the presence flag for the room B that is a non-targeted room is set to "ON" (S5751). For example, in the conditioning control for the room B at S600 shown in FIG. 5, when the presence of the person 70 in the room B is confirmed in a process corresponding to FIG. 11, the presence flag for room B is set to "ON". In this way, when the controller 60 judges whether the presence flag for the room B is set to "ON" and the judgment result is that the presence flag for the room B is not set to "ON" (No at S5751), the controller 60 judges that the person 70 is not in the room B and sets the duct-close flag for the room B to "ON" (S5752). In a similar manner, the controller 60 judges whether the presence flag for the room C is set to "ON" (S5753). When the presence flag for the room C is not set to "ON" (No at S5753), the controller 60 sets the presence flag for the room C to "ON" (S5754). Furthermore, the controller 60 judges whether the presence flag for the room D is set to "ON" (S5755). When the presence flag for the room D is not set to "ON" (No at S5755), the controller 60 sets the presence flag for the room D to "ON" (S5756).

As a result of each process shown in FIG. 5 to FIG. 15, above, being performed, when the room A in which the person 70 is not present is being processed in energy-saving conditioning mode and the person 70 enters the room A, the operation changes to rapid conditioning mode depending on the temperature of the room A. As a result, the supply of cold air or warm air from the air-conditioning unit 12 to the room B, the room C, and the room D other than the room A is stopped. As shown in FIG. 1, the cold air or warm air generated by the air-conditioning unit 12 is supplied in a concentrated manner to the room A in which the operation has changed to rapid conditioning mode. Therefore, as shown in FIG. 4B, the temperature of the room A quickly changes.

According to the first embodiment, when the person 70 is detected in any of the rooms among the plurality of rooms A to D in the house 11, namely the room A according to the first embodiment, the controller 60 switches the operating mode of the conditioning in the room A in which the person 70 is detected from energy-saving conditioning mode to rapid conditioning mode. When rapid conditioning of the room A in which the person 70 is detected is performed, the controller 60 closes each open/close valve 32, 33, and 34 in each air-conditioner duct 22, 23, and 24 connecting the air-conditioning unit 12 to the room B, the room C, and the room D other than the room A. As a result, the cold air or warm air from the air-conditioning unit 12 is supplied to the room A in which the person 70 is detected. The cold air or warm air is not supplied to the room B, the room C, or the room D in which the person 70 is not detected. As a result, the cold air or warm air generated by the air-conditioning unit 12 is supplied in a concentrated manner to the room A that has been switched from energy-saving conditioning to rapid conditioning. The temperature of the room A is quickly controlled to the ordinary set temperature T1. On the other hand, although the temperatures of the room B, the room C, and the room D change as a result of the conditioning being stopped as shown in FIG. 4C, the person 70 does not experience discomfort even when the supply of cold air or warm air is interrupted because the person 70 is not in these rooms. When rapid conditioning of the room A is completed, the supply of cold air or warm air generated by the air-conditioning unit 12 to all rooms A to D of the house 11, including the room B, the room C, and the room D, resumes. Therefore, rapid temperature changes can be handled while maintaining overall conditioning of the house 11.

Second Embodiment

A central air-conditioning system according to a second embodiment of the present invention will be described. According to the second embodiment, the configuration of the central air-conditioning system 10 is the same as that according to the first embodiment. However, the flow of processes differs. Only the differences will hereinafter be described. Specifically, the unoccupied-room process and the presence checking process according to the second embodiment differ from those according to the first embodiment.

(Unoccupied-Room Process)

Figure 16:
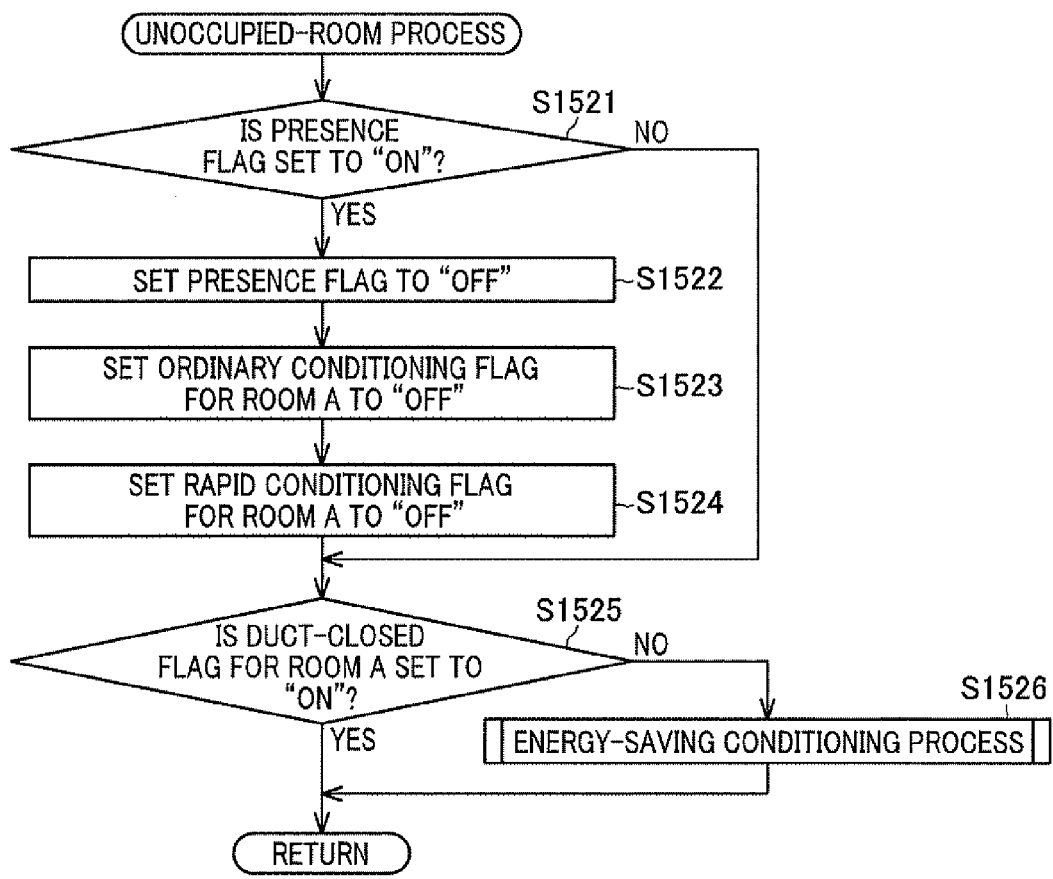
FIG. 16 is a diagram showing the flow of an unoccupied-room process for the room A in a central air-conditioning system according to a second embodiment.

The unoccupied-room process according to the second embodiment will be described with reference to FIG. 16.

When the controller 60 judges that the person 70 is not in the room A, the controller 60 performs the presence flag checking process for judging whether the presence flag for the room A is set to "ON" (S1521). In the unoccupied-room process, because a judgment is made that the person 70 is not in the room A in the person detecting process at S510, the controller 60 sets the presence flag to "OFF" (S1522).

After setting the presence flag for the room A to "OFF" at S1522, the controller 60 sets the ordinary conditioning flag for the room A to "OFF" (S1523). According to the second embodiment, the controller 60 further sets the rapid conditioning flag for the room A to "OFF" (S1524). When the person 70 is not in the room A, the process for the room A is changed to the energy-saving conditioning process in response to the absence of the person 70. Therefore, the controller 60 sets the rapid conditioning flag to "OFF" in addition to setting the ordinary conditioning flag to "OFF" for the room A.

When the controller 60 judges that the presence flag for the room A is "OFF" at S1521 (No at S1521) or sets the rapid conditioning flag to "OFF" at S1524, the controller 60 judges whether the duct-closed flag for the room A is "ON" (S1525). When the duct-closed flag for the room A is "ON" at S1525 (Yes at S1525), the controller 60 completes the process without opening or closing the open/close valve 31 in the air-conditioner duct 21 connected to the room A. On the other hand, when the controller 60 judges that the duct-closed flag for the room A is not set to "ON" at Step 1525 (No at S1525), the controller 60 proceeds to the energy-saving conditioning process for controlling the room A in energy-saving conditioning mode (S1526).

(Presence Checking Process)

Figure 17:
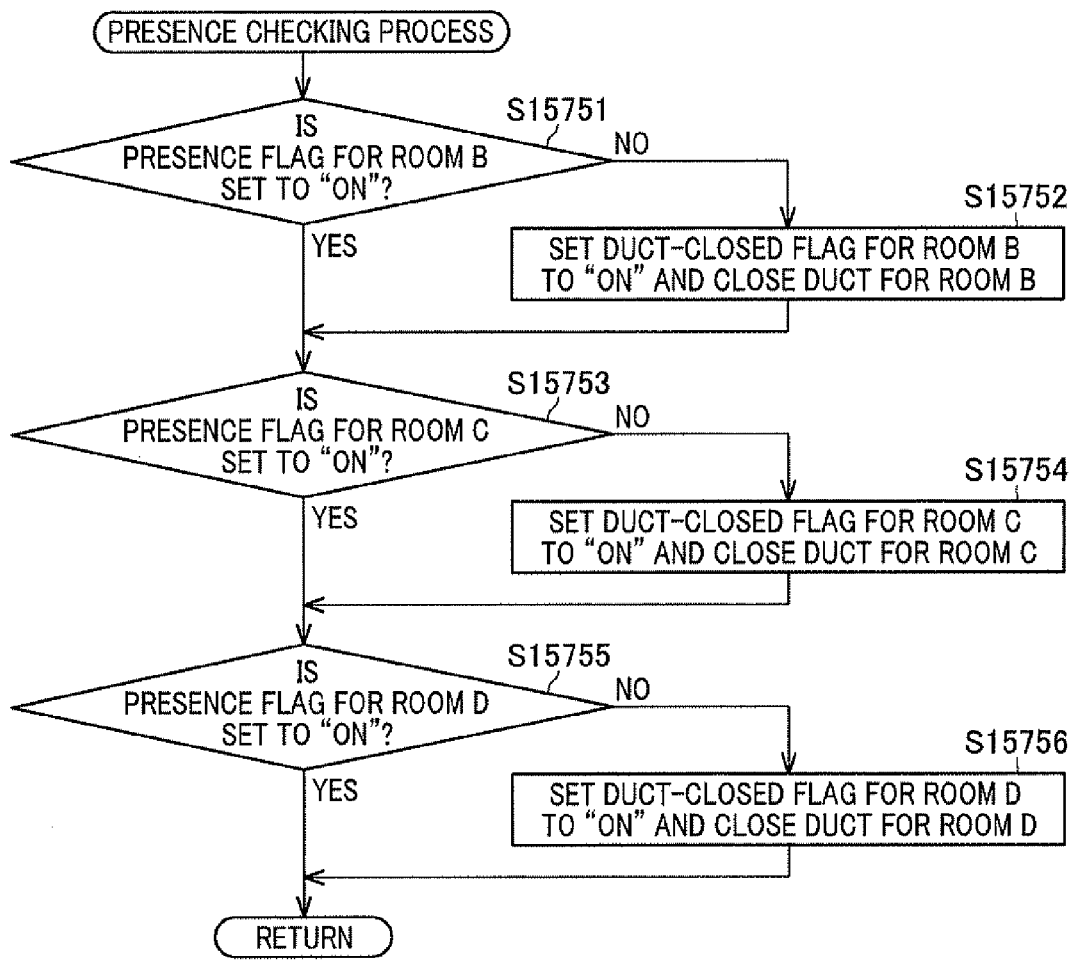
FIG. 17 is a diagram showing the flow of a presence checking process for the room A in the central air-conditioning system according to the second embodiment.

The presence checking process according to the second embodiment will be described with reference to FIG. 17.

The controller 60 judges whether the presence flag for the room B that is a non-targeted room is set to "ON" (S15751). When the controller 60 judges whether the presence flag for the room B is set to "ON" and the judgment result is that the presence flag for the room B is not set to "ON" (No at S15751), the controller 60 judges that the person 70 is not in the room B. The controller 60 sets the duct-closed flag for the room B to "ON" and closes the open/close valve 32 in the air-conditioner duct 22 connected to the room B (S15752). In a similar manner, the controller 60 judges whether the presence flag for the room C is set to "ON" (S15753). When the presence flag for the room C is not set to "ON" (No at S15753), the controller 60 sets the duct-closed flag for the room C to "ON" and closes the open/close valve 33 in the air-conditioner duct 23 connected to the room C (S15754). Furthermore, the controller 60 judges whether the presence flag for the room D is set to "ON" (S15755). When the presence flag for the room D is not set to "ON" (No at S15755), the controller 60 sets the duct-closed flag for the room D to "ON" and closes the open/close valve 34 in the air-conditioner duct 24 connected to the room D (S15756).

According to the second embodiment, as described regarding the above unoccupied-room process, when the duct-closed flag for the room A is judged to be "ON" at S1525, unlike in the process according to the first embodiment, the controller 60 completes the process without closing the open/ close valve 31 of the air-conditioner duct 21 connected to the room A. In other words, according to the second embodiment, when the presence flag is not set to "ON" in the presence checking process, the duct-closed flag is set to "ON" and each open/close valve 31 to 34 in each air-conditioner duct 21 to 24 connected to each room A to D is closed. As a result, each open/close valve 31 to 34 in each air-conditioner duct 21 to 24 connected to each room A to D always closes the air-conditioner duct 21 to 24 while the duct-closed flag is set to "ON", regardless of the control being performed in the other rooms.

As a result of the above configuration, according to the second embodiment, when the person 70 is not detected in the room B, the room C, and the room D that are the non-targeted rooms other than the room A that is targeted, not only is the duct-closed flag of the rooms B to D set to "ON", but each open/close valve 32 to 34 is also closed. In other words, when the person 70 is not detected in the room B, the room C, and the room D, not only are the duct-closed flags for the rooms B to D set to "ON", but the air-conditioner ducts 22 to 24 connected to the rooms B to D are immediately closed by the open/close valves 32 to 34. As a result, each open/close valve 32 to 34 is independently opened and closed, regardless of whether control is being performed in the room A that is targeted or the room B, room C, and room D that are not targeted. Therefore, the process can be simplified.

Third Embodiment

A central air-conditioning system according to a third embodiment of the present invention will be described. According to the third embodiment, the configuration of the central air-conditioning system 10 is the same as that according to the first embodiment. However, the flow of processes differs. The flow of processes performed by the central air-conditioning system 10 according to the third embodiment will hereinafter be described focusing on the differences. Common descriptions are omitted.

(Overall Process)

Figure 5:
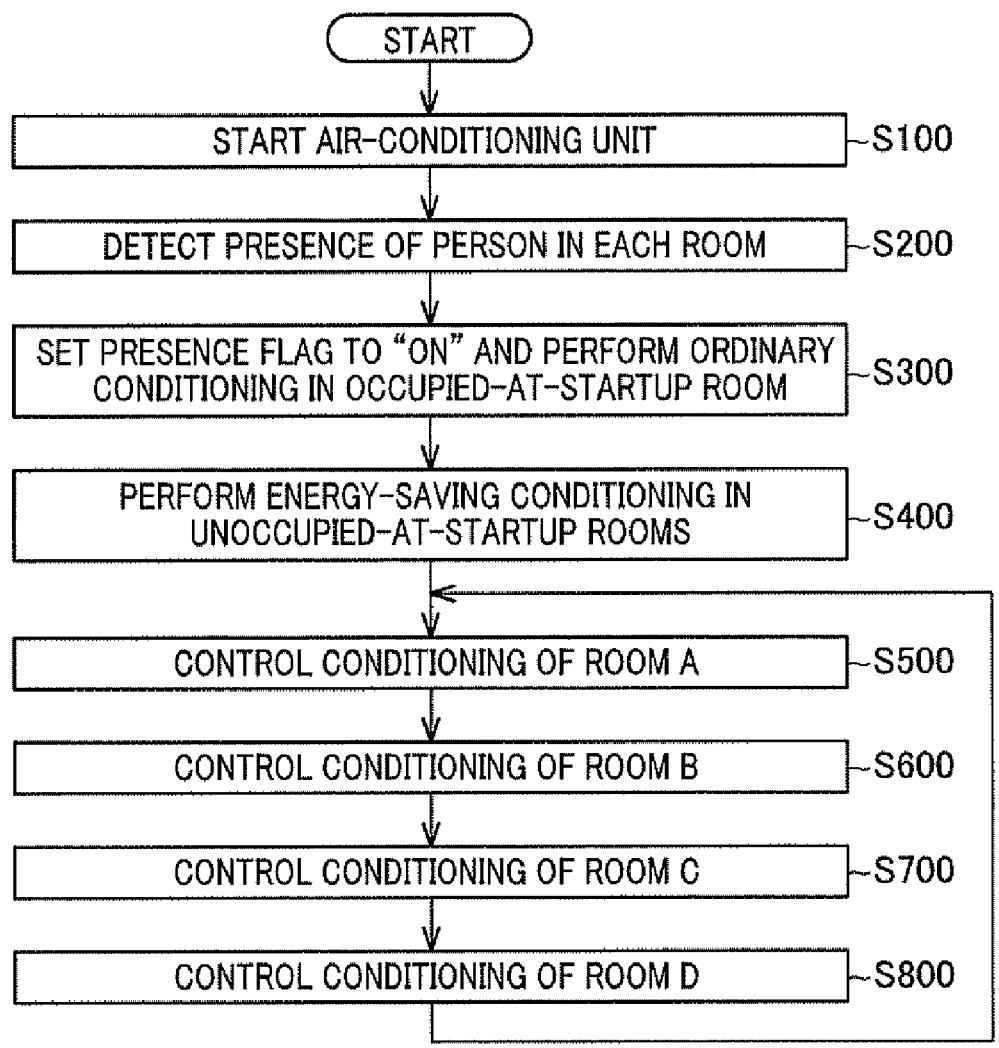
FIG. 5 is a diagram showing the overall flow of the central air-conditioning system according to the first embodiment.

The overall process of the central air-conditioning system 10 according to the third embodiment is similar to that according to the first embodiment shown in FIG. 5, In other words, the central air-conditioning system 10 according to the third embodiment includes the air-conditioning unit startup process (S100), the startup person detecting process (S200), the ordinary conditioning process (S300), the energy-saving conditioning process, and individual room conditioning control processes (S500 to S800).

(Individual Room Conditioning Control Process)

Figure 18:
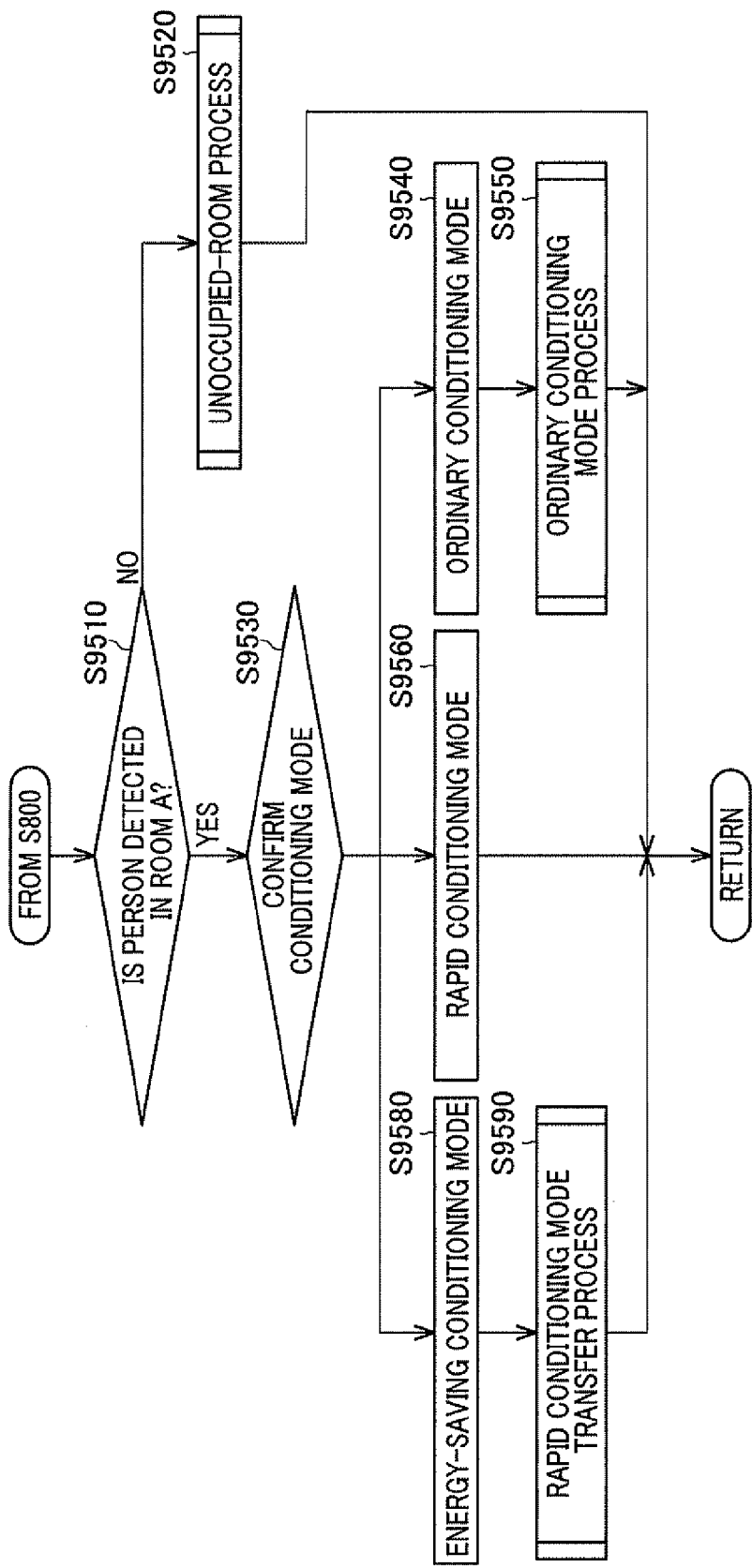
FIG. 18 is a diagram showing the flow of a conditioning control process for the room A in a central air-conditioning system according to a third embodiment.

Next, the flow of the individual room conditioning control processes will be described with reference to FIG. 18.

The controller 60 performs the person detecting process for detecting the presence of the person 70 in the targeted room A (S9510). When the person 70 is not detected in the room A (No at S9510), the controller 60 proceeds to the unoccupied-room process (S9520). On the other hand, when the person 70 is detected in the room A (Yes at S9510), the controller 60 performs the conditioning mode confirmation process for confirming the conditioning mode of the room A (S9530). Here, when the person 70 is detected in the room A and the conditioning mode confirmed at S9530 is ordinary conditioning mode (S9540), the controller 60 proceeds to the ordinary conditioning mode process for continuing operation in the ordinary conditioning mode (S9550).

On the other hand, when the person 70 is detected in the room A at S9510 and the conditioning mode confirmed at S9530 is rapid conditioning mode (S9560), the controller 60 returns to S600 of the overall flow shown in FIG. 5. When the person 70 is detected in the room A at S510 and the conditioning mode confirmed at S530 is energy-saving conditioning mode (S9580), the controller 60 proceeds to the rapid conditioning mode transfer process (S9590). When the controller 60 completes the process for the room A by performing any of the unoccupied-room process at S9520, the ordinary conditioning mode process at S9550, or the rapid conditioning mode transfer process at S9590, the controller 60 proceeds to the process for the room B at S600.

The person detecting process at S9510 is the same as that in the flow shown in FIG. 7, described according to the first embodiment. Therefore, explanation of the person detecting process will be omitted.

(Unoccupied-Room Process)

The unoccupied-room process at S9520 is the same as that in the flow shown in FIG. 8, described according to the first embodiment. Therefore, explanation of the unoccupied-room process will be omitted.

(Conditioning Mode Confirmation Process)

Next, details of the flow of the conditioning mode confirmation process at S9530 in FIG. 18 will be described with reference to FIG. 19.

When the controller 60 judges that the person 70 is in the room A in the person detecting process at S9510, the controller 60 judges whether the ordinary conditioning flag for the room A is set to "ON" (S9531). When the controller 60 judges that the ordinary conditioning flag for the room A is set to "ON" (Yes at S9531), the controller 60 proceeds to S9540 and continues conditioning the room A in ordinary conditioning mode. On the other hand, when the controller 60 judges that the ordinary conditioning flag for the room A is not set to "ON" (No at S9531), the controller 60 judges whether the temperature of the room A is within the temperature control range Δt (S9532). The controller 60 acquires the temperature of the room A from the temperature sensor 41 of the room A and judges whether the acquired temperature is within the temperature control range M.

When the controller 60 judges that the temperature of the room A is within the temperature control range Δt (Yes at S9532), the controller 60 sets the ordinary conditioning flag for the room A to "ON" (S9533) and sets the rapid conditioning flag for the room A to "OFF" (S9534). Then, the controller 60 proceeds to S9540 and continues conditioning the room A in ordinary conditioning mode.

When the controller 60 judges that the temperature of the room A is not within the temperature control range Δt (No at S9532), the controller 60 judges whether the rapid conditioning flag for the room A is set to "ON" (S9536). When the rapid conditioning flag for the room A is set to "ON" (Yes at S9536), the controller 60 judges that the operating mode is rapid conditioning mode, proceeds to S9560, and completes the process. When the rapid conditioning flag is not set to "ON" (No at S9536), the controller 60 judges that the operating mode is energy-saving conditioning mode and proceeds to Step S9580. The controller 60 then proceeds to the rapid conditioning mode transfer process at S9590 to perform rapid conditioning of the room A.

As described above, according to the third embodiment, only the unoccupied-room process, the ordinary conditioning mode process, and the rapid conditioning mode transfer process are included. The rapid conditioning mode in-progress process according to the first embodiment is not included.

(Rapid Conditioning Mode Transfer Process)

Figure 20:
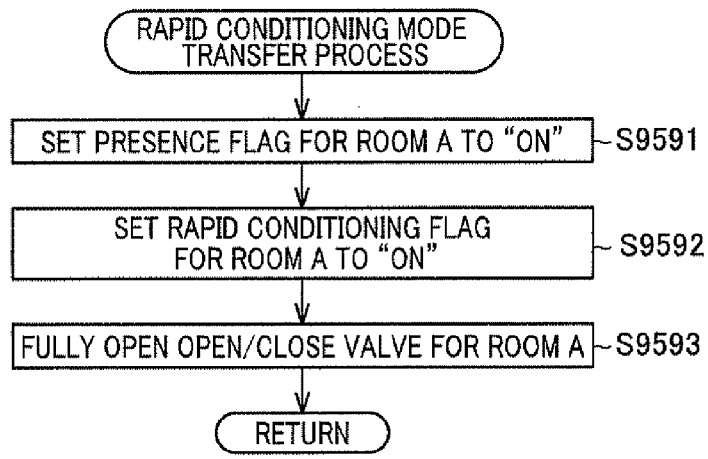
FIG. 20 is a diagram showing the flow of a rapid conditioning mode transfer process for the room A in the central air-conditioning system according to the third embodiment.

The flow of the rapid conditioning mode transfer process will be described with reference to FIG. 20.

Figure 19:
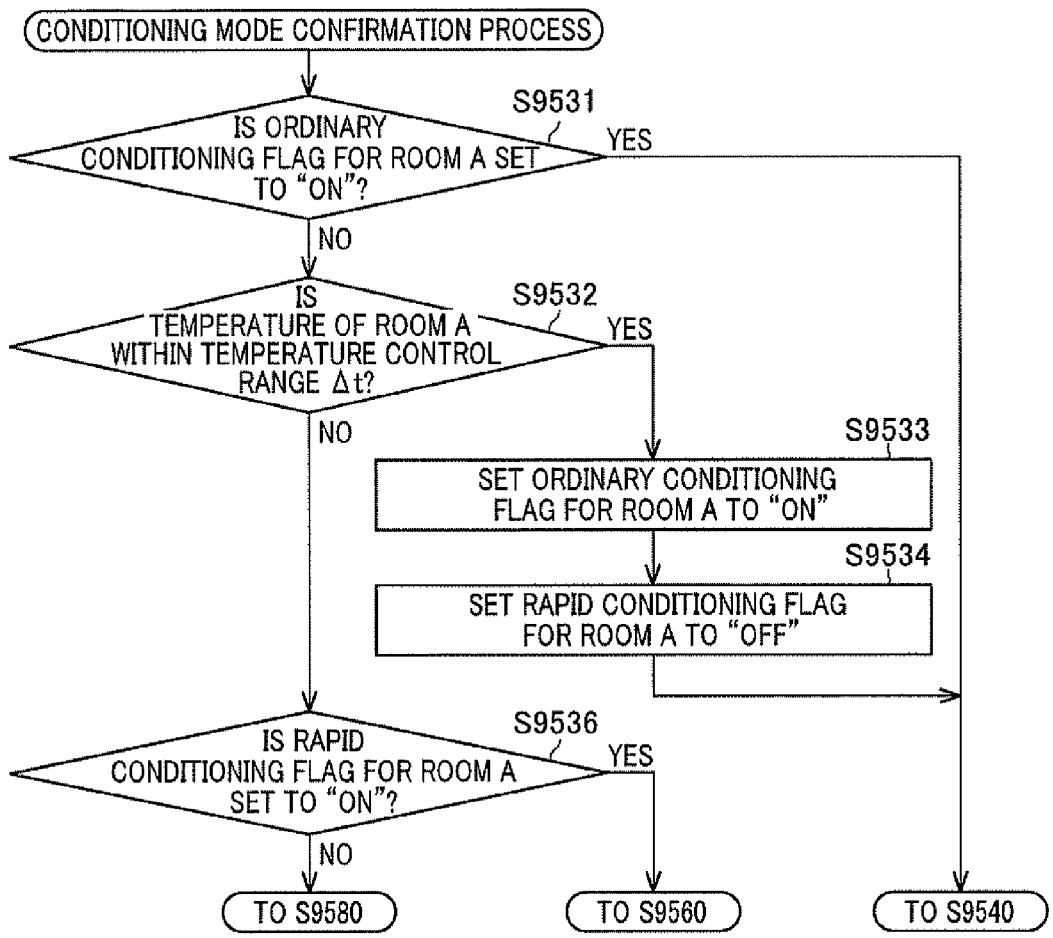
FIG. 19 is a diagram showing the flow of a conditioning mode confirmation process for the room A in the central air-conditioning system according to the third embodiment.

When the rapid conditioning flag for the room A is not set to "ON" at S9536 in FIG. 19, the controller 60 proceeds to the rapid conditioning mode transfer process as described above. When the controller 60 confirms that the person 70 has entered the room A at S9510, the controller 60 sets the presence flag for the room A to "ON" (S9591). The controller 60 then sets the rapid conditioning flag for the room A to "ON" to change the operating mode of the room A to rapid conditioning mode (S9592). Furthermore, the controller 60 fully opens the open/close valve 31 in the air-conditioner duct 21 connected to the room A to perform rapid conditioning of the room A (S9592). In other words, according to the third embodiment, the controller 60 fully opens the open/close valve 31 for the room A when the rapid conditioning flag for the room A is set to "ON", regardless of the presence of the person 70 in the room B, the room C, and the room D other than the room A that is targeted, and the like.

(Ordinary Conditioning Mode Process)

Figure 12:
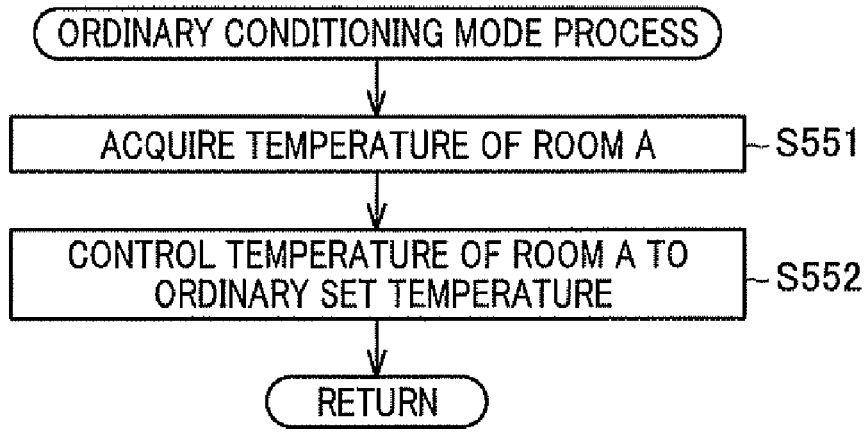
FIG. 12 is a diagram showing the flow of an ordinary conditioning mode process for the room A in the central air-conditioning system according to the first embodiment.

The ordinary conditioning mode process at S9550 is the same as that in the flow shown in FIG. 12, described according to the first embodiment. Therefore, explanation of the ordinary conditioning mode process will be omitted.

(Energy-Saving Conditioning Mode Process)

The energy-saving conditioning mode process at S9520 is the same as that in the flow shown in FIG. 12, described according to the first embodiment. Therefore, explanation of the energy-saving conditioning mode process will be omitted.

According to the third embodiment described above, in addition to the effects according to the first embodiment, the following effects can be achieved. The controller 60 controls the opening and closing of only the open/close valve 31 of the targeted room A. Therefore, the process performed by the controller 60 is completed by only control of the room A that is being targeted. Control performed in the other rooms B to D are not affected. As a result, control routines and procedures are simplified. Therefore, when subsequent maintenance is performed, when the number of rooms in the house 11 and the like subsequently change, or when changes to specification or design are made in accompaniment with product improvement and the like, control can be more easily added and changed. In addition, control is more versatile, allowing reuse without changing specifications and the like accumulated by past developments.

Other Embodiments

According to the embodiments described above, an example is described in which the house 11 has four rooms, A to D. However, the house 11 can have any number of rooms as long as there is two or more. According to the above-described embodiments, the room A is given as an example for a room that is targeted. However, processes similar to each process for the room A can be performed for the other rooms B to D.

According to the embodiments, an example is described in which the load placed on the central air-conditioning system 10 in ordinary conditioning mode and energy-saving conditioning mode is increased and decreased by a difference being provided between the ordinary set temperature T1 and the unoccupied-room set temperature T2. However, the load placed on the central air-conditioning system 10 can be increased and decreased by a difference being provided between the temperature control range Δt in ordinary conditioning mode and a temperature control range Δtx in energy-saving conditioning mode. For example, when the ordinary set temperature is set to Tn, the temperature control range Δt in ordinary conditioning mode is set to ±3° C., whereas the temperature control range Δtx in energy-saving conditioning mode is set to ±5° C. As a result, a configuration is achieved in which the load placed on the central air-conditioning system 10 is increased and decreased.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A central air-conditioning system comprising:
a single air-conditioning unit that generates heat exchange and outputs air generated by the heat exchange;
a plurality of air-conditioning ducts that connect the air-conditioning system and a plurality of rooms of a house and allows the heat-exchanged air to pass therethrough;
a plurality of open/close valves respectively arranged at each of the air-conditioning ducts to selectively open and close each of the air-conditioning ducts;
a plurality of person sensors respectively arranged in each of the rooms to detect whether or not there is a person in each of the rooms;
a plurality of temperature sensors respectively arranged in each of the rooms to detect temperature of each of the rooms; and
a controller that controls the temperature of the rooms, room by room, by selectively opening and closing the open/close valves based on information indicative of both whether or not the person is present in each of the rooms and the temperature of each of the rooms detected by the temperature sensors,
the controller executing software to provide functionality comprising:
i) a startup process that starts up the air-conditioning unit;
ii) a startup person detection process that allows the person sensors to detect whether or not there is a person in each of the rooms;
iii) an ordinary conditioning process that sets a first flag ON to perform ordinary conditioning for an occupied room detected by the startup person detection process, the ordinary conditioning controlling the temperature of a room at a predetermined ordinary temperature;
iv) an energy-saving conditioning process that performs energy-saving conditioning for an unoccupied room detected startup person detection process, the energy-saving conditioning controlling the temperature of a room at a predetermined lower temperature that is lower in an air-conditioning load than the ordinary conditioning; and
v) an individual room conditioning control process that performs either of the individual room conditioning control process and the energy-saving conditioning process such that the temperature of each of the rooms is controlled individually,
wherein the individual room conditioning control process includes
i) a person detecting process that allows the person sensors to detect by turn whether or not there is a person in each of the rooms;
ii) a conditioning mode confirming process that confirms that any of ordinary conditioning, rapid conditioning, and the energy-saving conditioning is currently in operation in each of targeted rooms, which are detected by the person detecting process, the rapid conditioning requiring intensive conditioning in the targeted rooms, and iii) a control process that allows an unoccupied-room process to be performed for a targeted room when the person detecting process detects no person in the targeted room; allows a ordinary conditioning mode process to be performed for a targeted room when the person detecting process detects a person therein and the conditioning mode confirming process confirms that the ordinary conditioning is in operation in the targeted room; allows a rapid conditioning mode in-progress process to be performed for a targeted room when the person detecting process detects a person therein and the conditioning mode confirming process confirms that the rapid conditioning is in operation in the targeted room; and allows a rapid conditioning mode transfer process for a targeted room when the person detecting process detects a person therein and the conditioning mode confirming process confirms that the energy-saving conditioning is in operation in the targeted room;

wherein the unoccupied-room process is configured to
perform a presence flag checking process to check whether or not a first flag is made ON to show the presence of the person in the targeted room,
set the first flag OFF when the first flag is currently ON,
set a second flag ON for the room being performed, the second flag indicating that the ordinary conditioning should be performed or not,
set any of the first and second flags OFF when the presence flag checking process checks that the first flag is currently OFF,
determine whether or not a third flag is ON which indicates closing or opening one of the open/close valves, which is arranged at one of the air-conditioning ducts;
close the one of the open/close valves when it is determined that the third flag is ON, and
allow an energy-saving conditioning process to be performed for the energy-saving conditioning process for the targeted room when it is determined that the third flag is OFF;

wherein the conditioning mode confirming process is configured to
determine whether or not the second flag for each of the targeted rooms is ON,
transfer the conditioning mode in a targeted room, to the ordinary conditioning mode process for the ordinary conditioning when it is determined that the second flag is ON,
determine whether or not the temperature of the targeted room, which is detected by one of the temperature sensors, is within an allowed temperature control range which is set to the predetermined ordinary temperature when the second flag is OFF which shows that the ordinary conditioning is not in operation in the targeted room,
set ON the second flag for the targeted room and set OFF a fourth flag therefor when it is determined that the temperature of the targeted room is within the allowed temperature control range, the fourth flag showing whether or not the rapid conditioning should be performed,
perform, after making the fourth flag OFF, a duct restoring process which allows remaining open/close valves among the open/close valves to be opened, the remaining open/close valves being arranged at, of the air-conditioning ducts, remaining air-conditioning ducts connected to remaining rooms other than the targeted room among the plurality of rooms,
transfer the conditioning mode in the targeted room to the ordinary conditioning mode process,
determine whether or not the fourth flag for the targeted room is ON when it is determined that the temperature thereof is out of the allowed temperature control range,
transfer the conditioning mode in the targeted room to a rapid conditioning mode in-progress process permitting the rapid conditioning being continued, when it is determined that the fourth flag therefor is ON, and
transfer the conditioning mode in the targeted room to the rapid conditioning mode transfer process when it is determined that the fourth flag therefor is OFF;

wherein the rapid conditioning mode transfer process is configured to
set ON the first flag for a room among the targeted rooms and set ON the fourth flag for the targeted room when it is detected that a person has entered the room,
determine whether or not the third flag for an open/close valve among the open/close valves, which is for the targeted room, is made ON,
set OFF the third flag for the targeted room if it is determined that the third flag therefor is OFF,
keep the third flag for the targeted room OFF when it is determine that third flag therefor is OFF,
perform a presence checking process for checking whether or not the person is preset in the non-targeted rooms among the plurality of rooms, and
fully open the open/close valve arranged at the air-conditioning duct connected to the targeted room, before transfer to the conditioning control for the non-targeted rooms;

wherein the rapid conditioning mode in-progress process is configured to
perform the presence confirming process after the conditioning mode confirming process, before transfer to the conditioning control for the non-targeted rooms;

wherein the ordinary conditioning mode process is configured to
detect the temperature of the targeted room using one of the temperature sensors which is arranged in the room therefor, after the conditioning mode confirming process, and
control the temperature of the targeted room based on the detected temperature and the predetermined ordinary temperature, before the transfer to the conditioning control for the non-targeted rooms;

wherein the energy-saving conditioning process is configured to
detect the temperature of the targeted room using one of the temperature sensors which is arranged in the room therefor when the third flag therefor is OFF during the unoccupied-room process is in operation, and
perform the conditioning control the temperature of the targeted room, based on both the detected temperature and the unoccupied-room set temperature, before the transfer to the conditioning control for the non-targeted rooms;

wherein the presence checking process include a flag setting process configured to
determine whether or not the first flag for each of the non-targeted rooms is ON, and set ON the third flag for each of the air-conditioning ducts connected to the non-targeted rooms when the first flag for each of the non-targeted rooms is OFF; and wherein the duct restoring process includes a flag unsetting process configured to determine whether or not whether or not open/close valves among the plurality of open/close valves arranged at the air-conditioning ducts connected to the non-targeted rooms are closed, and set OFF the third flag for the non-targeted rooms when it is determined that the open/close valves among the plurality of open/close valves are closed.

2. The central air-conditioning system of claim 1, wherein the unoccupied-room process is configured to set the first flag ON and set OFF for both the second and fourth flags for the targeted room, when the first flag is OFF; and the presence checking process is configured to determine whether or not the first flag for each of the non-targeted rooms is ON, and to perform both a third flag setting process which sets ON the third flag, room by room, for the non-targeted rooms and a duct closing process which closes the open/close valve dependent on making the third flag ON, when it is determined that the first flag for each of the non-targeted rooms is OFF.

3. A central air-conditioning system comprising:

a single air-conditioning unit that generates heat exchange and outputs air generated by the heat exchange;

a plurality of air-conditioning ducts that connect the air-conditioning system and a plurality of rooms of a house and allows the heat-exchanged air to pass therethrough;

a plurality of open/close valves respectively arranged at each of the air-conditioning ducts to selectively open and close each of the air-conditioning ducts;

a plurality of person sensors respectively arranged in each of the rooms to detect whether or not there is a person in each of the rooms;

a plurality of temperature sensors respectively arranged in each of the rooms to detect temperature of each of the rooms; and a controller that controls the temperature of the rooms, room by room, by selectively opening and closing the open/close valves based on information indicative of both whether or not the person is present in each of the rooms and the temperature of each of the rooms detected by the temperature sensors, the controller executing software to provide functionality comprising:

i) a startup process that starts up the air-conditioning unit;

ii) a startup person detection process that allows the person sensors to detect whether or not there is a person in each of the rooms;

iii) an ordinary conditioning process that sets a first flag ON to perform ordinary conditioning for an occupied room detected by the startup person detection process, the ordinary conditioning controlling the temperature of a room at a predetermined ordinary temperature;

iv) an energy-saving conditioning process that performs energy-saving conditioning for an unoccupied room detected startup person detection process, the energy-saving conditioning controlling the temperature of a room at a predetermined lower temperature that is lower in an air-conditioning load than the ordinary conditioning; and v) an individual room conditioning control process that performs either of the individual room conditioning control process and the energy-saving conditioning process such that the temperature of each of the rooms is controlled individually, wherein the individual room conditioning control process includes i) a person detecting process that allows the person sensors to detect by turn whether or not there is a person in each of the rooms;

ii) a conditioning mode confirming process that confirms that any of ordinary conditioning, rapid conditioning, and the energy-saving conditioning is currently in operation in each of targeted rooms, which are detected by the person detecting process, the rapid conditioning requiring intensive conditioning in the targeted rooms, and iii) a control process that allows an unoccupied-room process to be performed for a targeted room when the person detecting process detects no person in the targeted room; allows an ordinary conditioning mode process to be performed for a targeted room when the person detecting process detects a person therein and the conditioning mode confirming process confirms that the ordinary conditioning is in operation in the targeted room; maintains the rapid conditioning for a targeted room when the person detecting process detects a person therein and the conditioning mode confirming process confirms that the rapid conditioning is in operation in the targeted room; and allows a rapid conditioning mode transfer process for a targeted room when the person detecting process detects a person therein and the conditioning mode confirming process confirms that the energy-saving conditioning is in operation in the targeted room;

wherein the unoccupied-room process is configured to
perform a presence flag checking process to check whether or not a first flag is made ON to show the presence of the person in the targeted room, and
perform an energy-saving conditioning process in which the first flag is made OFF when the presence flag checking process checks that the first flag is currently ON, a second flag is made ON for the room being performed, the second flag indicating that the ordinary conditioning should be performed or not, any of the first and second flags is made OFF when the presence flag checking process checks that the first flag is currently OFF, it is determined whether or not a fourth flag is ON, the fourth flag indicating whether or not the rapid conditioning should be performed in any of non-targeted rooms other than the targeted room among the plurality of rooms, the close/open valve arranged at the air-conditioning duct for the targeted room is closed when it is determined that a fifth flag is ON, and the energy-saving conditioning is performed for the targeted room when it is determined that the fifth flag is OFF;

wherein the conditioning mode confirming process is configured to
determine whether or not the second flag for each of the is targeted rooms is ON,
transfer the conditioning mode in a targeted room, to the ordinary conditioning mode process for the ordinary conditioning when it is determined that the second flag is ON,
determine whether or not the temperature in the targeted room, which is detected by one of the temperature sensors, is within an allowed temperature control range which is set to the predetermined ordinary temperature when the second flag is OFF which shows that the ordinary conditioning is not in operation in the targeted room, transfer the conditioning mode for the targeted room to the ordinary conditioning mode after making ON the second flag for the targeted room and making OFF the fourth flag therefor, when it is determined that the temperature of the targeted room is within the allowed temperature control range, determine whether or not the fourth flag for the targeted room is ON when it is determined that the temperature thereof is out of the allowed temperature control range, transfer the conditioning to the conditioning control for the non-targeted rooms when it is determined that the fourth flag for the targeted room is ON, and transfer the conditioning mode to the rapid conditioning mode transfer process when it is determined that the fourth flag for the targeted room is OFF;

wherein the rapid conditioning mode transfer process is configured to set ON the first flag for a room among the targeted rooms and set ON the fourth flag for the targeted room when it is detected that a person has entered the room, and fully open the open/close valve arranged at the air-conditioning duct connected to the targeted room, before transfer to the conditioning control for the non-targeted rooms;

wherein the ordinary conditioning mode process is configured to detect the temperature of the targeted room using one of the temperature sensors which is arranged in the room therefor, after performing the conditioning mode confirming process, and control the temperature of the targeted room based on the detected temperature and the predetermined ordinary temperature, before the transfer to the conditioning control for the non-targeted rooms; and wherein the energy-saving conditioning process is configured to detect the temperature of the targeted room using one of the temperature sensors which is arranged in the room therefor when the third flag therefor is OFF during the unoccupied-room process is in operation, and perform the conditioning control the temperature of the targeted room, based on both the detected temperature and the unoccupied-room set temperature, before the transfer to the conditioning control for the non-targeted rooms.

* * * * *